US011511599B2

(12) United States Patent
Maeng

(10) Patent No.: US 11,511,599 B2
(45) Date of Patent: Nov. 29, 2022

(54) METHOD FOR CONTROLLING TEMPERATURE OF REFRIGERATOR PROVIDED IN VEHICLE

(71) Applicant: LG ELECTRONICS INC., Seoul (KR)

(72) Inventor: Jichan Maeng, Seoul (KR)

(73) Assignee: LG ELECTRONICS INC., Seoul (KR)

(*) Notice: Subject to any disclaimer, the term of this patent is extended or adjusted under 35 U.S.C. 154(b) by 515 days.

(21) Appl. No.: 16/657,567

(22) Filed: Oct. 18, 2019

(65) Prior Publication Data

US 2020/0047587 A1 Feb. 13, 2020

(30) Foreign Application Priority Data

Sep. 2, 2019 (KR) .................. 10-2019-0108147

(51) Int. Cl.
*G06V 10/40* (2022.01)
*B60H 1/00* (2006.01)
*G06T 7/00* (2017.01)

(52) U.S. Cl.
CPC ..... *B60H 1/00964* (2013.01); *B60H 1/00014* (2013.01); *B60H 1/00735* (2013.01); *B60H 1/00878* (2013.01); *G06V 10/40* (2022.01); *G06T 7/00* (2013.01)

(58) Field of Classification Search
CPC ............ B60H 1/00964; B60H 1/00014; B60H 1/00735; B60H 1/00878; B60H 1/0073; B60H 1/00264; G06V 10/40; G06T 7/00; F25D 29/00; F25D 23/10; F25D 2400/34; F25D 2700/121
See application file for complete search history.

(56) References Cited

U.S. PATENT DOCUMENTS

| 2007/0086624 | A1* | 4/2007 | Breed | ............... B60R 21/01552 382/104 |
| 2013/0016119 | A1* | 1/2013 | Ukawa | ................... G09G 5/005 345/589 |
| 2018/0196403 | A1* | 7/2018 | Lagares-Greenblatt | ..................... G06Q 50/00 |
| 2019/0186817 | A1* | 6/2019 | Hwang | .................... G05D 1/00 |

* cited by examiner

*Primary Examiner* — Stephen G Sherman
(74) *Attorney, Agent, or Firm* — Birch, Stewart, Kolasch & Birch, LLP

(57) ABSTRACT

A method for controlling a temperature of a refrigerator provided in a vehicle is provided. A method for controlling a temperature of a refrigerator provided in a vehicle according to an embodiment of the present disclosure detects a foodstuff requiring a low temperature storage included in image information of an article using an artificial neutral network model, and when the foodstuff requiring the low temperature storage is detected, can prevent deterioration of the foodstuff while the article is transported through the vehicle by controlling a temperature of the refrigerator based on storage temperature information of the foodstuff requiring the low temperature storage. A temperature control device of a refrigerator installed in a vehicle of the present disclosure is associated with an artificial intelligence module, an unmmanned aerial vehicle (UAV) robot, an augmented reality (AR) device, a virtual reality (VR) device, and a device related to a 5G service.

18 Claims, 21 Drawing Sheets

FIG. 4
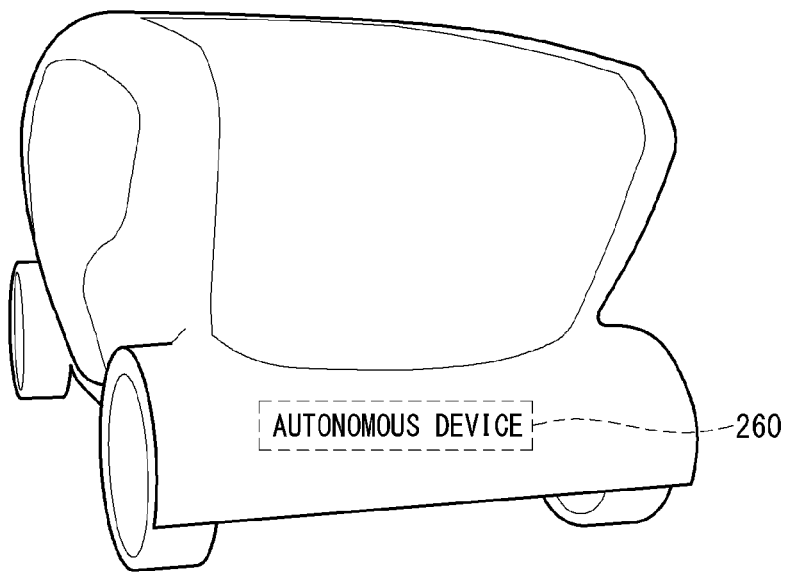
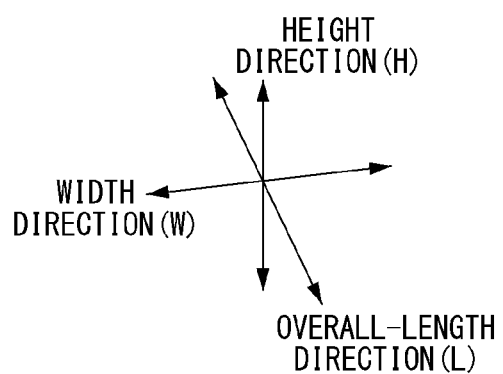

METHOD FOR CONTROLLING TEMPERATURE OF REFRIGERATOR PROVIDED IN VEHICLE

CROSS-REFERENCE TO RELATED APPLICATIONS

This application claims the benefit of priority to Korean Patent Application No. 10-2019-0108147 filed in the Republic of Korea on Sep. 2, 2019, which is hereby incorporated by reference in its entirety.

BACKGROUND

Field of the Disclosure

The present disclosure relates to a method for controlling a temperature of a refrigerator provided in a vehicle, and particularly, a method for controlling a temperature of a refrigerator provided in a vehicle capable of identifying a foodstuff requiring a low temperature storage.

Related Art

An artificial intelligence (AI) system is a computer system that achieves human-level intelligence, which, unlike existing rule-based smart systems, makes machines smart enough to learn and decide on their own. The more the artificial intelligence system is used, the higher its recognition rate and the better it understands a user's preferences. Hence, the existing rule-based smart systems are being gradually replaced by deep learning-based artificial intelligence systems.

Artificial intelligence technologies include machine learning and element technologies using machine learning.

Machine learning is an algorithm that classifies and learns features from input data on their own, whereas the element technologies are technologies that mimic human brain functions such as perception, decision making, etc. using machine learning algorithms such as deep learning, which include a number of technical fields, including language understanding, visual understanding, reasoning/prediction making, knowledge representation, motion control, etc.

Artificial intelligence technology can be applied to the following various subfields. Language understanding is concerned with recognizing, applying, and processing human language/text, which includes natural language processing, machine translation, question answering, speech recognition/synthesis. Visual understanding is concerned with recognizing and processing objects just as human vision does, which includes object recognition, object tracking, image retrieval, human recognition, scene understanding, spatial understanding, image enhancement, etc. Reasoning/prediction making is concerned with understanding information and making logical inferences and predictions, which includes knowledge/probability-based reasoning, optimal prediction, preference-based planning, recommendation, etc. Knowledge representation is concerned with the automated transformation of human experiences into knowledge data, which includes knowledge building (data creation/classification), knowledge management (application of data), etc. Motion control is concerned with controlling the driving of self-driving vehicles and the movement of robots, which includes movement control (navigation, collision, and driving), manipulation control (behavior control), etc.

A vehicle generates heat while driving, and thus, this heat may deteriorate a foodstuff located inside the vehicle. In particular, the foodstuff are sensitive to heat, and when a foodstuff requiring low temperature storage are exposed to external heat, states of the foodstuff may be changed.

SUMMARY OF THE DISCLOSURE

The present disclosure aims to achieve the above-described needs and/or to solve the above-described problems.

The present disclosure also provides a method for controlling a temperature of a refrigerator provided in a vehicle capable of detecting a foodstuff requiring a low temperature storage based on image information.

The present disclosure also provides a method for controlling a temperature of a refrigerator provided in a vehicle capable of controlling a storage temperature of a foodstuff based on temperature information.

The present disclosure also provides a method for controlling a temperature of a refrigerator provided in a vehicle capable of controlling the temperature of the refrigerator in advance based on purchase information of an article and location information of the vehicle.

In an aspect, a method for controlling a temperature of a refrigerator provided in a vehicle is provided. The method includes receiving image information inside the refrigerator provided in the vehicle, applying feature information extracted from image information including an image of at least one article to a pre-learned first ANN model and determining whether the article is a foodstuff requiring a low temperature storage according to an output value, and when the article is the foodstuff requiring the low temperature storage, searching recommended storage information of the foodstuff to generate storage temperature information and generating a signal for controlling a target cooling temperature inside the refrigerator according to the storage temperature information.

The refrigerator may be provided in a trunk of the vehicle.

The method may further include receiving information on a temperature inside the refrigerator.

The information on the temperature inside the refrigerator may be acquired by at least one of an infrared sensor or a thermal imaging camera provided in the refrigerator.

The method may further include adjusting the target cooling temperature inside the refrigerator based on the information on the temperature inside the refrigerator.

The receiving of the information on the temperature inside the refrigerator may receive the temperature information at specific time intervals.

The method may further include measuring a temperature change by comparing temperature information received at the specific time intervals, and adjusting the target cooling temperature according to the temperature change.

The method may further include receiving purchase information of the foodstuff.

The purchase information may include at least one of an article purchase place, a type and amount of the article, recommended storage information, temperature sensitivity, and an external temperature of the article purchase place.

The method may further include determining whether the foodstuff requiring the low temperature storage is included in the article according to the purchase information.

The generating of the signal for controlling the target cooling temperature may include generating the signal for controlling the target cooling temperature inside the refrigerator in advance while receiving the purchase information of the foodstuff.

The generating of the signal for controlling the target cooling temperature may include receiving location information of the vehicle, measuring an estimated travel time from an article purchase place of the vehicle to a location of the vehicle, applying external temperature information of the article purchase place and the estimated travel time to a second ANN model and predicting a temperature change of the foodstuff according to an output value, and generating a signal for controlling the target cooling temperature according to the predicted temperature change.

The target cooling temperature of the refrigerator may be a temperature obtained by setting the target cooling temperature of the refrigerator in inverse proportion to the temperature change of the foodstuff before a door of the refrigerator is opened.

The method may further include receiving, from a network, downlink control information (DCI) used to schedule transmission of image information including an image of the at least one article, in which the image information including the image of the at least one article may be transmitted to the network based on the DCI.

The method may further include performing an initial connection procedure with the network based on a synchronization signal block (SSB), in which the image information including the image of the at least one article may be transmitted to the network through a PUSCH, and the SSB and a DM-RS of the PUSCH may be quasi co-located (QCL) for QCL type D.

In another aspect, a device for controlling a temperature of a refrigerator provided in a vehicle is provided. The device includes a communication module configured to receive image information inside the refrigerator provided in the vehicle, and a processor configured to apply feature information extracted from image information including an image of at least one article to a pre-learned first ANN model, determine whether the article is a foodstuff requiring a low temperature storage according to an output value, and when the article is the foodstuff requiring the low temperature storage, search recommended storage information of the foodstuff to generate storage temperature information and generate a signal for controlling a target cooling temperature inside the refrigerator according to the storage temperature information.

The communication module may receive information on a temperature inside the refrigerator, and the processor may adjust the target cooling temperature inside the refrigerator based on the information on the temperature inside the refrigerator.

The communication module may receive the temperature information at specific time intervals, and the processor may measure a temperature change by comparing temperature information received at the specific time intervals and adjust the target cooling temperature according to the temperature change.

The communication module may receive purchase information of the foodstuff, and the processor may determine whether the foodstuff requiring the low temperature storage is included in the article according to the purchase information and generate the signal for controlling the target cooling temperature inside the refrigerator in advance while receiving the purchase information of the foodstuff.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

FIG. 4 is a diagram showing a vehicle according to an embodiment of the present disclosure.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
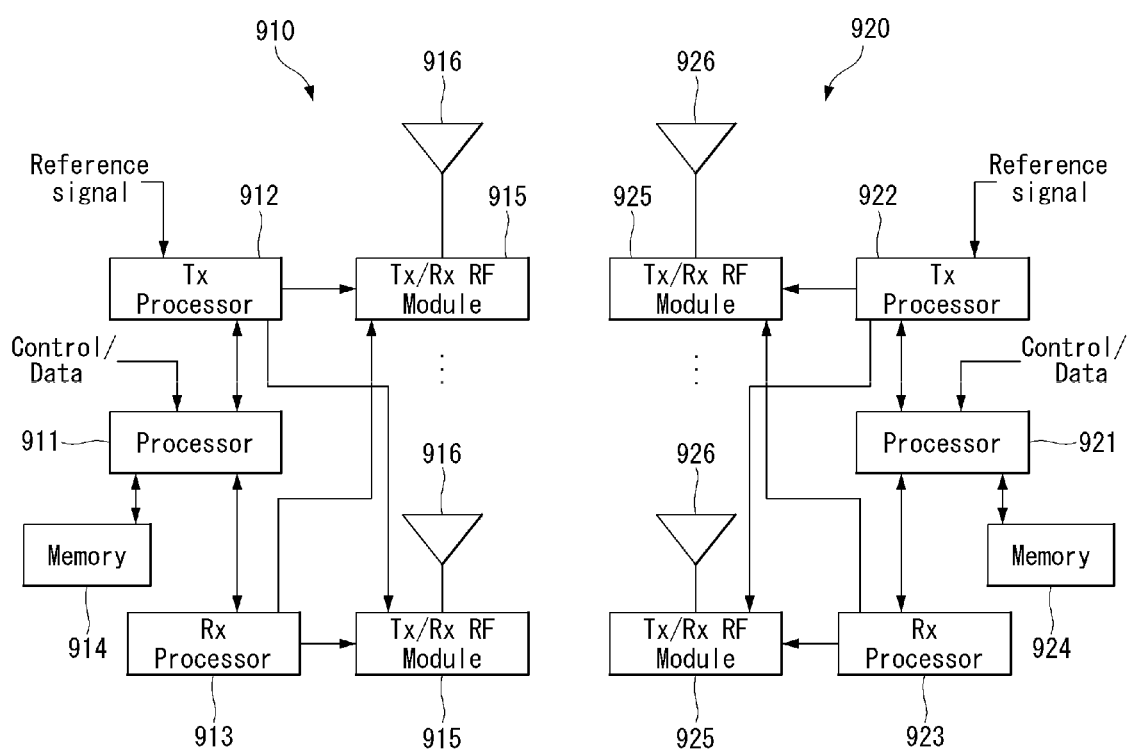
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
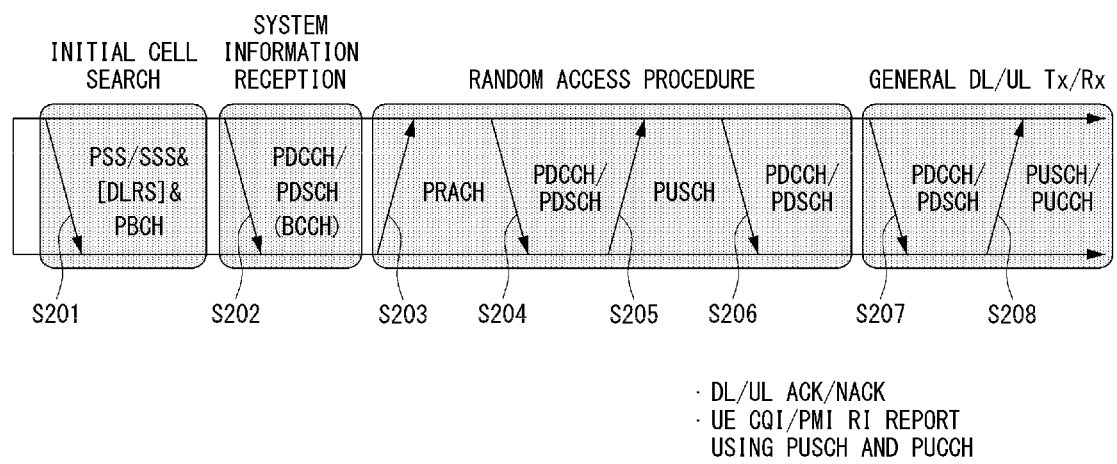
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary/synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. Along sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporal)/identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

ABM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequency Sect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, returning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) returning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
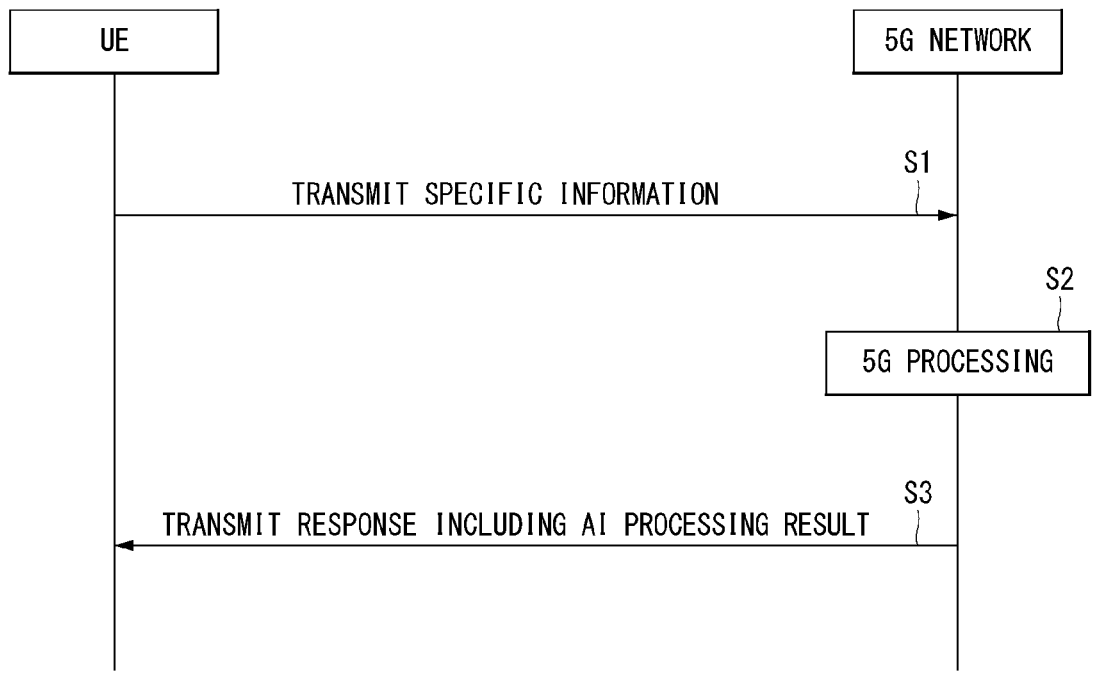
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication system

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 4 is a diagram showing a vehicle according to an embodiment of the present disclosure.

Referring to FIG. 4, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

AI Device Block

Figure 5:
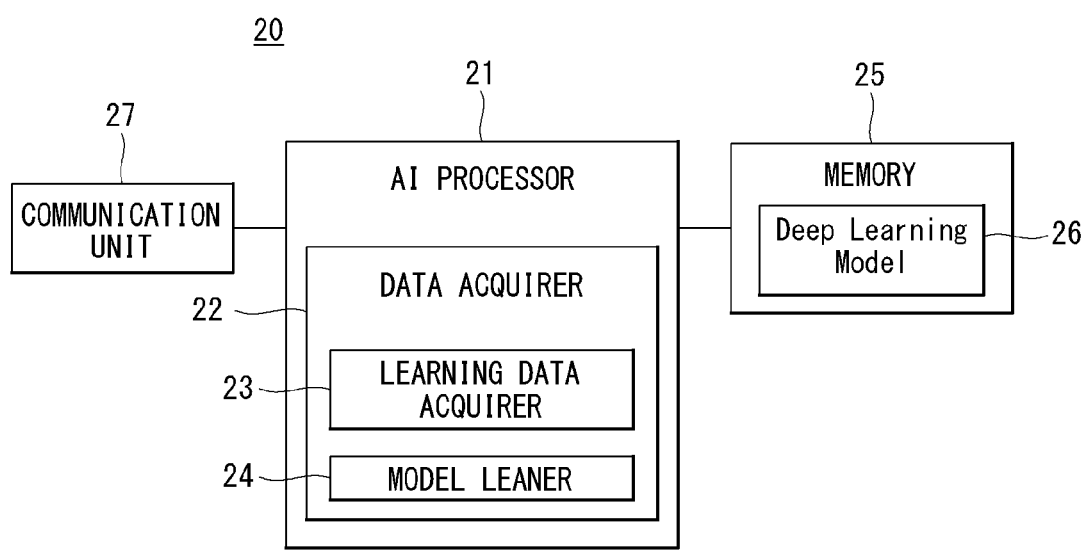
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 10 shown in FIG. 4 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 6:
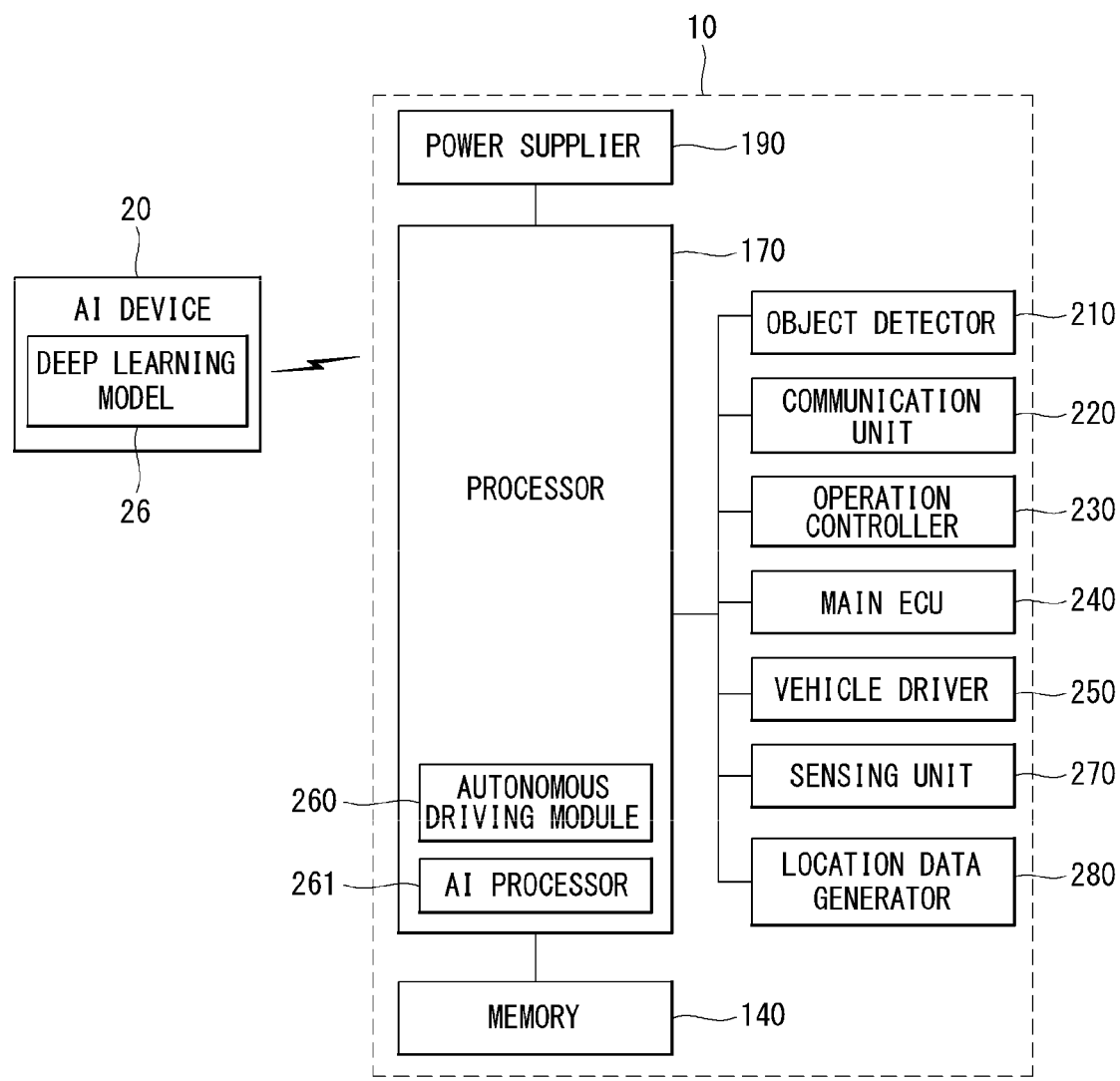
FIG. 6 is a block diagram showing a detailed configuration of the autonomous driving vehicle of FIG. 4.

FIG. 6 is a block diagram showing a detailed configuration of the autonomous driving vehicle of FIG. 4.

Referring to FIG. 6, the autonomous driving intelligent service providing apparatus 200 may transmit data required to be subjected to AI processing to an AI device 20 using a communication unit. The AI device 20 including the deep-learning model 26 may transmit the AI processing result using the deep-learning model 26 to the autonomous driving intelligent service providing apparatus 200. The details about the AI device 20 may refer to the description in FIG. 6.

The autonomous driving intelligent service providing apparatus 200 may include a memory 140, a processor 170, and a power supply 190. The processor 170 may further include an autonomous driving module 260 and an AI processor 261. Further, the autonomous driving intelligent service providing apparatus 200 may include an interface that may be connected to at least one electronic device provided in the vehicle in a wired or wireless manner to exchange data necessary for autonomous driving control therewith. The at least one electronic device connected thereto using the interface may include an object detector 210, a communication unit 220, a driving manipulating unit 230, a main ECU 240, a vehicle driver 250, a sensor 270, and a location data generation unit 280.

The interface may comprise at least one of a communication module, a terminal, a pin, a cable, a port, a circuit, an element and a device.

The memory 140 is electrically connected to the processor 170. The memory 140 may store basic data about the unit, control data for controlling the operation of the unit, and data as input/output. The memory 140 may store data processed by the processor 170. The memory 140 may be composed of at least one of ROM, RAM, EPROM, flash drive, and hard drive in hardware. The memory 140 may store various data for operation of the autonomous driving intelligent service providing apparatus 200, such as a program for processing or controlling the processor 170. The memory 140 may be implemented integrally with the processor 170. Depending on the embodiments, the memory 140 may be categorized as a sub-component of the processor 170.

The power supply 190 may power autonomous driving device IV. The power supply 190 may receive power from a power source (e.g., battery) included in the autonomous driving intelligent service providing apparatus 200, and supply the power to each unit of the autonomous driving intelligent service providing apparatus 200. The power supply 190 may be operated according to a control signal provided from the main ECU 240. The power supply 190 may include an SMPS (switched-mode power supply).

The processor 170 may be electrically coupled to the memory 140, interface 280, and power supply 190 to exchange signals therewith. The processor 170 may be implemented using at last one of an ASIC (application specific integrated circuit), DSPs (digital signal processors), DSPs (digital signal processing devices), PLDs (programmable logic devices), FPGAs (field programmable gate arrays), processors, controllers, microcontrollers or microprocessors or the electrical units for execution of the functions.

The processor 170 may be driven by the power provided from a power supply 190. The processor 170 receives data, processes data, generates signals, or supplies signals in a state where the power is supplied thereto from the power supply 190.

The processor 170 may receive information from other electronic devices in the autonomous driving intelligent service providing apparatus 200 using an interface. The processor 170 may provide control signals to the other electronic devices within the autonomous driving intelligent service providing apparatus 200 using the interface.

The autonomous driving intelligent service providing apparatus 200 may include at least one printed circuit board (PCB). The memory 140, interface, power supply 190, and processor 170 may be electrically connected to the printed circuit board.

Hereinafter, other electronic devices and the AI processor 261 and the autonomous driving module 260 in the vehicle as connected to the interface will be described in more detail. Hereinafter, the autonomous driving intelligent service providing apparatus 200 will be referred to as an intelligent service providing apparatus 200 for convenience of explanation.

First, the object detector 210 may generate information about an object outside the intelligent service providing apparatus 200. The AI processor 261 applies a neural network model to the data obtained using the object detector 210. Thus, at least one of the absence or presence of the object, the position information of the object, the distance information between the vehicle and the object, and the relative speed information between the vehicle and the object may be generated by the AI processor 261.

The object detector 210 may include at least one sensor capable of detecting an object outside the intelligent service providing apparatus 200. The sensor may include at least one of a camera, a radar, a lidar, an ultrasonic sensor, and an infrared sensor. The object detector 210 may provide data about the object generated based on the sensing signal as generated by the sensor to at least one electronic device included in the vehicle.

Further, the intelligent service providing apparatus 200 transmits data acquired using the at least one sensor to the AI device 20 using the communication unit 220. The AI device 20 may apply the neural network model 26 to the transmitted data and transmit the generated AI processed data to the intelligent service providing apparatus 200. The intelligent service providing apparatus 200 recognizes information on the detected object based on the received AI processed data Thus, the autonomous driving module 260 may perform autonomous driving control operations using the recognized information.

The communication unit 220 may exchange signals with devices located outside the intelligent service providing apparatus 200. The communication unit 220 may exchange signals with at least one of an infrastructure (for example, a server, a broadcasting station), another vehicle, or a terminal. The communication unit 220 may include at least one of a transmitting antenna, a receiving antenna, an RF (Radio Frequency) circuit and an RF device capable of implementing various communication protocols to perform communication.

Applying the neural network model to the data obtained using the object detector 210 may result in generating at least one of presence or absence of object, position information of object, distance information of the vehicle and object, and relative speed information between vehicle and object.

The driving manipulating unit 230 is a device that receives a user input for driving. In the manual mode, the intelligent service providing apparatus 200 may be operated based on signals provided by the driving manipulating unit 230. The driving manipulating unit 230 may include a steering input device, for example, a steering wheel, an acceleration input device, for example, an accelerator pedal and a brake input device, for example, a brake pedal.

Further, in the autonomous driving mode, the AI processor 261 may generate an input signal of the driver manipulation unit 230 according to a signal for controlling the vehicle movement according to the driving plan generated using the autonomous driving module 260.

Further, the intelligent service providing apparatus 200 transmits data necessary for controlling the driver manipulation unit 230 to the AI device 20 using the communication unit 220. The AI device 20 may apply the neural network model 26 to the transmitted data and then transmit the generated AI processed data to the intelligent service providing apparatus 200. Thus, the intelligent service providing apparatus 200 may use the input signal of the driver manipulation unit 230 for vehicle motion control based on the received AI processed data.

The main ECU 240 may control the overall operation of the at least one electronic device provided in the intelligent service providing apparatus 200.

The vehicle driver 250 is a device that electrically controls various vehicle driving devices in the intelligent service providing apparatus 200. The vehicle driver 250 may include a powertrain drive control device, a chassis drive control device, a door/window drive control device, a safety device drive control device, a lamp drive control device, and an air conditioning drive control device. The powertrain drive control device may include a power source drive control device and a transmission drive control device. The chassis drive control device may include a steering drive control device, a brake drive control device, and a suspension drive control device. Further, the safety device drive control device may include a seat belt drive control device for seat belt control.

The vehicle driver 250 may include at least one electronic control device, for example, control ECU (Electronic Control Unit).

The vehicle driver 250 may control the power train, the steering device, and the brake device based on signals received from the autonomous driving module 260. The signal received from the autonomous driving module 260 may be a driving control signal generated by applying the neural network model to the vehicle-related data using the AI processor 261. The drive control signal may be a signal received from an external AI device 20 using the communication unit 220.

The sensor 270 may sense the state of the vehicle. The sensor 270 may include at least one of an IMU (inertial measurement unit sensor), a crash sensor, a wheel sensor wheel sensor, a speed sensor, a tilt sensor, a weight sensor, a heading sensor, position module, vehicle forward/reverse sensor, battery sensor, fuel sensor, tire sensor, steering sensor, a temperature sensor, a humidity sensor, an ultrasonic sensor, an illuminance sensor, and a pedal position sensor. Further, the IMU (inertial measurement unit) sensor may include at least one of an acceleration sensor, a gyro sensor, and a magnetic sensor.

The AI processor 261 may generate vehicle state data by applying the neural network model to the sensing data generated by the at least one sensor. The AI processing data generated by applying the neural network model include vehicle orientation data, vehicle motion data, vehicle yaw data, vehicle roll data, vehicle pitch data, vehicle collision data, vehicle direction data, vehicle angle data, vehicle speed data, vehicle acceleration data, vehicle slope data, vehicle forward/backward data, vehicle weight data, battery data, fuel data, tire air pressure data, vehicle internal temperature data, vehicle internal humidity data, steering wheel rotation angle data, vehicle exterior brightness data, pressure data to be applied to the accelerator pedal, and pressure data to be applied to the brake pedal, etc.

The autonomous driving module 260 may generate the driving control signal based on the AI processed state data of the vehicle.

Further, the intelligent service providing apparatus 200 transmits the sensing data obtained using the at least one sensor to the AI device 20 using the communication unit 22. Then, the AI device 20 may apply the neural network model 26 to the transmitted sensing data and then transmit the generated AI processed data to the intelligent service providing apparatus 200.

The location data generation unit 280 may generate location data of the intelligent service providing apparatus 200. The location data generation unit 280 may include at least one of a GPS (Global Positioning System) and a DGPS (Differential Global Positioning System).

The AI processor 261 may generate more precise vehicle position data by applying the neural network model to the position data generated by the at least one position data generation unit.

According to one embodiment, the AI processor 261 performs a deep-learning operation based on at least one of the IMU (Inertial Measurement Unit) of the sensor 270 and the camera image of the object detection device 210. The position data may be corrected by the AI processor based on the generated AI processed data.

Further, the intelligent service providing apparatus 200 transmits position data obtained from the location data generation unit 280 to the AI device 20 using the communication unit 220. Then, the AI device 20 may apply the neural network model 26 to the received position data and then may transmit the generated AI processed data to the intelligent service providing apparatus 200.

The intelligent service providing apparatus 200 may include an internal communication system 50. A plurality of electronic devices included in the intelligent service providing apparatus 200 may exchange signals via the internal communication system 50. The signal may include data. The internal communication system 50 may use at least one communication protocol, for example, CAN, LIN, FlexRay, MOST, Ethernet.

The autonomous driving module 260 generates a path for autonomous driving based on the acquired data and creates a driving plan for traveling along the generated route.

The autonomous driving module 260 may implement at least one ADAS (Advanced Driver Assistance System) function. The ADAS may implement at least one of ACC (Adaptive Cruise Control) system, AEB (Autonomous Emergency Braking) system, FCW (Forward Collision Warning) system, LKA (Lane Keeping Assist) system, LCA (Lane Change Assist) system, TFA (Target Following Assist) system, BSD (Blind Spot Detection) system, HBA (High Beam Assist) system, APS (Auto Parking System) system, PD (collision warning system) system, TSR (Traffic Sign Recognition) system, TSA (Traffic Sign Assist) system, NV (Night Vision) system, DSM (Driver Status Monitoring) system, and TJA (Traffic Jam Assist) system.

The AI processor 261 applies the traffic-related information received from the external device or the at least one sensor included in the vehicle, and the information received from the other vehicle communicating with the vehicle to the neural network model. Thus, a control signal capable of performing at least one of the ADAS functions as described above may be transmitted from the AI processor 261 to the autonomous driving module 260.

Further, the intelligent service providing apparatus 200 transmits at least one data to perform ADAS functions to the AI device 20 using the communication unit 220. The AI device 20 may apply the neural network model 260 to the received data and thus deliver a control signal capable of performing the ADAS function to the intelligent service providing apparatus 200.

The autonomous driving module 260 may obtain driver status information and/or vehicle status information from the AI processor 261 and perform the switching operation from the autonomous driving mode to the manual driving mode or the switching from the manual driving mode to the autonomous driving mode based on the driver status information and/or vehicle status information.

Further, the intelligent service providing apparatus 200 may utilize AI processed data for passenger support to execute driving control. For example, as described above, the intelligent service providing apparatus 200 may use the at least one sensor provided inside the vehicle to check the status of the driver and the passenger.

Alternatively, the intelligent service providing apparatus 200 may use the AI processor 261 to recognize the voice signal of the driver or occupant, and to perform a voice processing operation and to execute the speech synthesis operation In the above, the outlines for performing AI processing by applying the 5G communication and the 5G communication necessary to implement the vehicle control method according to an embodiment of the present disclosure, and transmitting and receiving the AI processing result.

Figure 7:
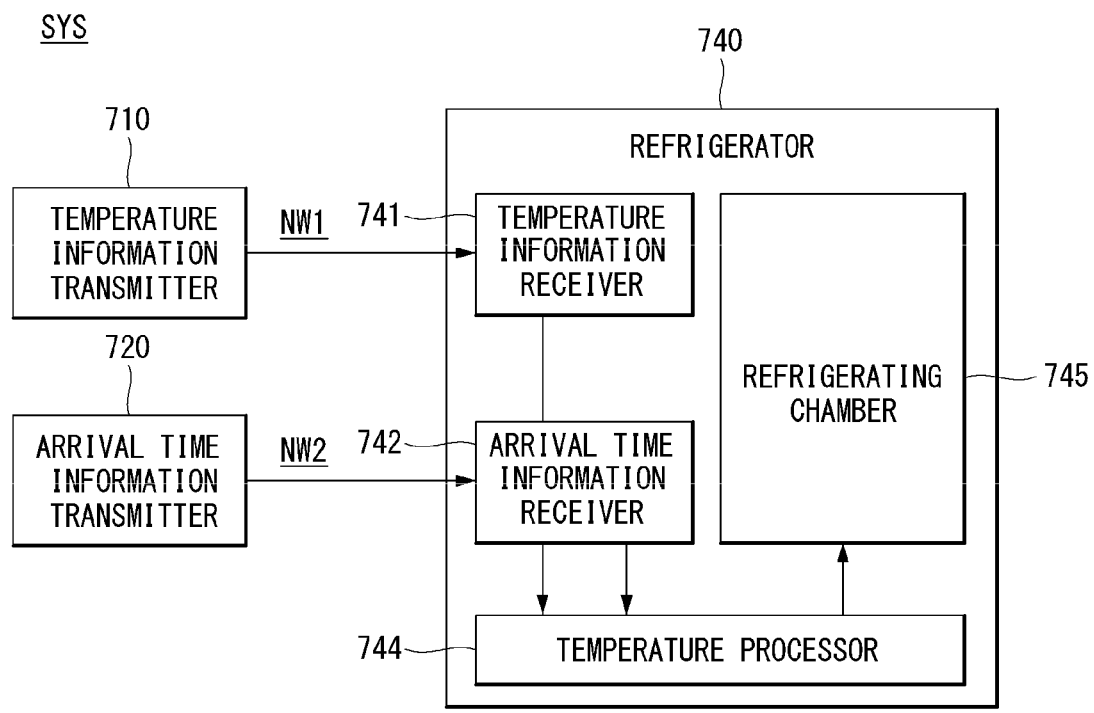
FIG. 7 is a block diagram showing a temperature control system of an artificial intelligent refrigeration device according to an embodiment of the present disclosure.

FIG. 7 is a block diagram showing a temperature control system of an artificial intelligent refrigeration device according to an embodiment of the present disclosure.

Referring to FIG. 7, the temperature control system (SYS) of the artificial intelligent refrigeration device according to the present disclosure includes an artificial intelligent refrigerator 740 according to an embodiment.

The artificial intelligent refrigerator 740 according to an embodiment may be a refrigerator which includes a temperature information receiver 741, an arrival time information receiver 742, a temperature processor 744, and a refrigerating chamber 745.

The refrigerating chamber 745 is a space for keeping a foodstuff (food or the like) at a constant temperature to maintain freshness of the foodstuff as long as possible.

A temperature of the refrigerating compartment 745 is controlled through cold air generated by a thermodynamic refrigeration cycle. To this end, the refrigerating chamber 745 is provided with a cold air inlet, and the cold air inlet may be connected to a refrigerant compressor through a cold air transport medium. At least one refrigerating chamber 745 may be provided, and each of the refrigerating chambers 745 is isolated from the outside by a refrigerating chamber door.

The temperature information receiver 741 receives external temperature information of a place where the foodstuff purchased through the communication unit 27 is located. The temperature information receiver 741 may be integrated into the temperature processor 744.

The arrival time information receiver 742 receives information on an estimated time of arrival required until the foodstuff is stored in the refrigerating chamber 745 through the communication unit 27. The arrival time information receiver 742 may be integrated into the temperature processor 744.

The temperature processor 744 presets a target cooling temperature of the refrigerator compartment 745 for the foodstuff based on an artificial intelligence processor equipped with a neural network model before the foodstuff is stored in the refrigerator compartment 745. The temperature processor 744 inputs the external temperature information received by the temperature information receiver 741 and the information on the estimated time of arrival received by the arrival time information receiver 742 into the neural network model and estimates a temperature change of the foodstuff until the foodstuff is received into the refrigerator compartment 745. The temperature control unit 744 presets the target cooling temperature of the refrigerating compartment 745 before the foodstuff is received in the refrigerating compartment 745 based on an estimated temperature change of the foodstuff. The temperature processor 744 may preset the target cooling temperature of the refrigerator compartment 745 in inverse proportion to the estimated temperature change of the foodstuff before the door of the refrigerator compartment 745 is opened for storing the foodstuff. In this way, if the temperature of the refrigerating compartment 745 is preset to the target cooling temperature, it is possible to easily perform a constant temperature control for maintaining the freshness of the foodstuff when the foodstuff is received in the refrigerating compartment 745.

Referring to FIG. 7, the temperature control system (SYS) of the artificial intelligent refrigeration device according to the present disclosure further includes a temperature information transmitter 710 and an arrival time information transmitter 720.

The temperature information transmitter 710 may be connected to the temperature information receiver 741 of the artificial intelligent refrigerator 740 through the first communication network NW1. The temperature information transmitter 710 may be implemented by a user portable terminal (wearable smart device, smart phone, or the like) as a temperature sensor, but is not limited thereto.

The arrival time information transmitter 720 may be connected to the arrival time information receiver 742 of the artificial intelligent refrigerator 740 through a second communication network NW2. The arrival time information transmitter 720 may be implemented as a navigation device of a foodstuff transport apparatus or a user portable terminal (a wearable smart device, a smart phone, or the like), but is not limited thereto.

Figure 8:
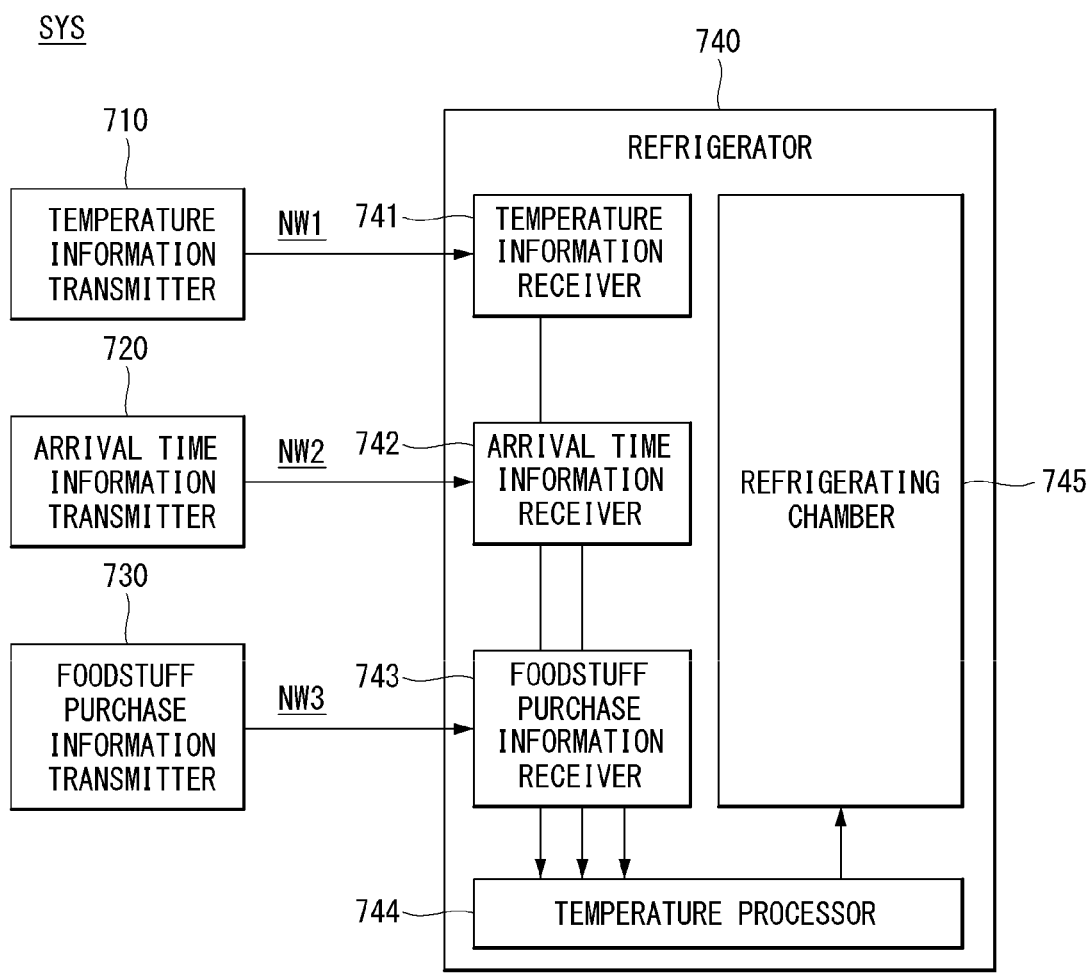
FIG. 8 is a block diagram illustrating a temperature control system of an artificial intelligent refrigeration device according to another embodiment of the present disclosure.

FIG. 8 is a block diagram illustrating a temperature control system of an artificial intelligent refrigeration device according to another embodiment of the present disclosure.

Referring to FIG. 7, the temperature control system (SYS) of the artificial intelligent refrigeration device according to the present disclosure includes an artificial intelligent refrigerator 740 according to another embodiment.

The artificial intelligent refrigerator 740 according to another embodiment may be a refrigerator which includes the temperature information receiver 741, the arrival time information receiver 742, a foodstuff purchase information receiver 743, the temperature processor 744, and the refrigerating chamber 745.

The refrigerating chamber 745 is a space for keeping the foodstuff (food or the like) at a constant temperature to maintain freshness of the foodstuff as long as possible. The temperature of the refrigerating compartment 745 is controlled through cold air generated by the thermodynamic refrigeration cycle. To this end, the refrigerating chamber 745 is provided with the cold air inlet, and a cold air inlet may be connected to a refrigerant compressor through a cold air transport medium. At least one refrigerating chamber 745 may be provided, and each of the refrigerating chambers 745 is isolated from the outside by a refrigerating chamber door.

The temperature information receiver 741 receives external temperature information of a place where the foodstuff purchased through the communication unit 27 is located. The temperature information receiver 741 may be integrated into the temperature processor 744.

The arrival time information receiver 742 receives information on an estimated time of arrival required until the foodstuff is stored in the refrigerating chamber 745 through the communication unit 27. The arrival time information receiver 742 may be integrated into the temperature processor 744.

The foodstuff purchase information receiver 743 receives foodstuff purchase information including a type and amount of foodstuff purchased through the communication unit 27. The foodstuff purchase information receiver 743 may be integrated into the temperature processor 744.

The temperature processor 744 presets a target cooling temperature of the refrigerator compartment 745 for the foodstuff based on an artificial intelligence processor equipped with a neural network model before the foodstuff is stored in the refrigerator compartment 745. The temperature processor 744 inputs the external temperature information received by the temperature information receiver 741, the information on the estimated time of arrival received by the arrival time information receiver 742, and the foodstuff purchase information received by the foodstuff purchase information receiver 743 into the neural network model and estimates a temperature change of the foodstuff until the foodstuff is received into the refrigerator compartment 745. In addition, the temperature control unit 744 presets the target cooling temperature of the refrigerating compartment 745 before the foodstuff is received in the refrigerating compartment 745 based on an estimated temperature change of the foodstuff. The temperature processor 744 may preset the target cooling temperature of the refrigerator compartment 745 in inverse proportion to the estimated temperature change of the foodstuff before the door of the refrigerator compartment 745 is opened for storing the foodstuff, and may differently set the target cooling temperature of the refrigerating chamber 745 according to temperature sensitivity of the type and amount of the purchased foodstuff. In this way, if the temperature of the refrigerating compartment 745 is preset to the target cooling temperature, it is possible to easily perform a constant temperature control for maintaining the freshness of the foodstuff when the foodstuff is received in the refrigerating compartment 745. When the target cooling temperature is set, considering the temperature sensitivity according to the type and amount of the purchased foodstuff is more effective in maintaining the freshness of the foodstuff Referring to FIG. 8, the temperature control system (SYS) of the artificial intelligent refrigeration device according to the present disclosure further includes the temperature information transmitter 710, the arrival time information transmitter 720, and a foodstuff purchase information transmitter 730.

The temperature information transmitter 710 may be connected to the temperature information receiver 741 of the artificial intelligent refrigerator 740 through the first communication network NW1. The temperature information transmitter 710 may be implemented by a user portable terminal (wearable smart device, smart phone, or the like) as a temperature sensor, but is not limited thereto.

The arrival time information transmitter 720 may be connected to the arrival time information receiver 742 of the artificial intelligent refrigerator 740 through the second communication network NW2. The arrival time information transmitter 720 may be implemented as the navigation device of a foodstuff transport apparatus or the user portable terminal (a wearable smart device, a smart phone, or the like), but is not limited thereto.

The foodstuff purchase information transmitter 730 may be connected to the foodstuff purchase information receiver 743 of the artificial intelligent refrigerator 740 through a third communication network NW3. The foodstuff purchase information transmitter 730 may be implemented as an automatic purchase behavior recognition system or the user portable terminal (wearable smart device, smart phone, or the like), but is not limited thereto.

The temperature control system (SYS) of the artificial intelligent refrigeration device described above may be implemented to be functionally embedded in the processor 170 provided in the vehicle. Meanwhile, it is noted that the temperature control system (SYS) may be referred to as a temperature control module integrated into one module.

Figure 9:
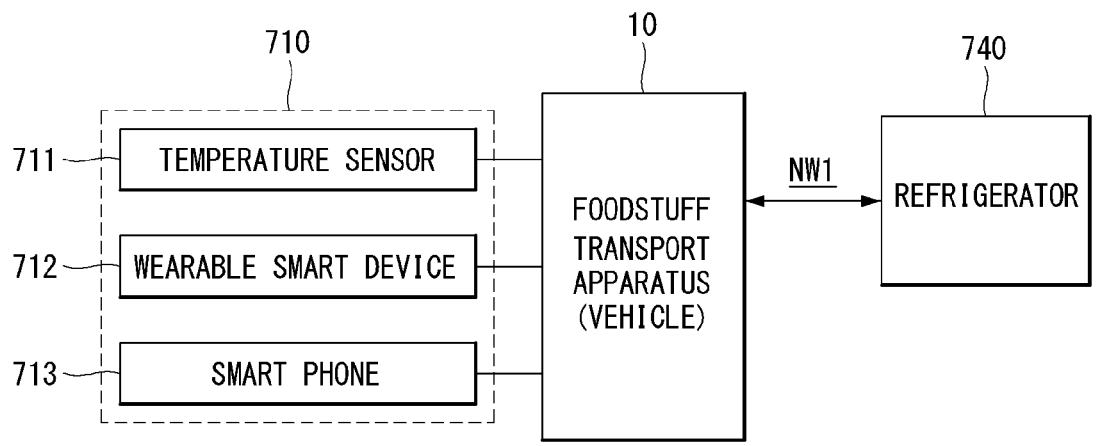
FIGS. 9 to 10 are diagrams illustrating an embodiment of the temperature information transmitter of FIGS. 7 and 8 associated with a vehicle.
Figure 10:
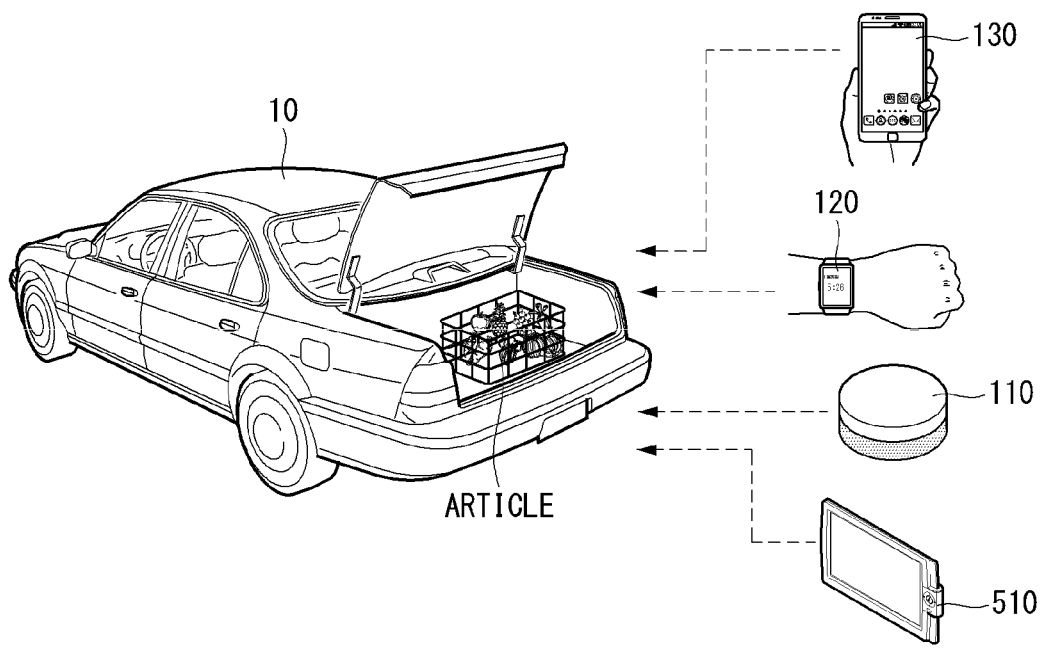

FIGS. 9 to 10 are diagrams illustrating an embodiment of the temperature information transmitter 710 of FIGS. 7 and 8 associated with a vehicle.

Referring FIGS. 9 to 10, the temperature information transmitter 710 may be associated with the vehicle 10 for transporting the purchased foodstuff to the refrigerator 740. The vehicle 10 may be a vehicle including a navigation device 721. The navigation device 721 may be connected to the refrigeration device 740 through the first communication network NW1.

The temperature information transmitter 710 may include a temperature sensor 711 and the navigation device 721. The temperature sensor 711 is mounted on the vehicle 10 to sense an external temperature of the place where the purchased foodstuff is located. For example, the temperature sensor 711 may be mounted in a trunk of the vehicle 10 in which the purchased foodstuff is loaded, but is not limited thereto. It is more preferable that the temperature sensor 711 is located close to the foodstuff so that the temperature change of the foodstuff can be accurately estimated. The navigation device 721 may transmit external temperature information obtained from the temperature sensor 711 to the temperature information receiver 741 of the refrigerator 740 through the first communication network NW1.

Meanwhile, the temperature information transmitter 710 may be the portable terminal provided in the user. The mobile terminal may or may not be associated with the vehicle 10. The portable terminal may include a wearable smart device, a smart phone, or the like.

The wearable smart device, the smart phone, or the like may be worn by a user who carries the purchased foodstuff to the refrigerator 740 and may sense the external temperature of the place where the foodstuff is located through a dedicated application related to temperature sensing. The wearable smart device, the smart phone, or the like may transmit the external temperature information obtained through the sensing to the temperature information receiver 741 of the refrigerator 740 through the first communication network NW1.

Figure 11:
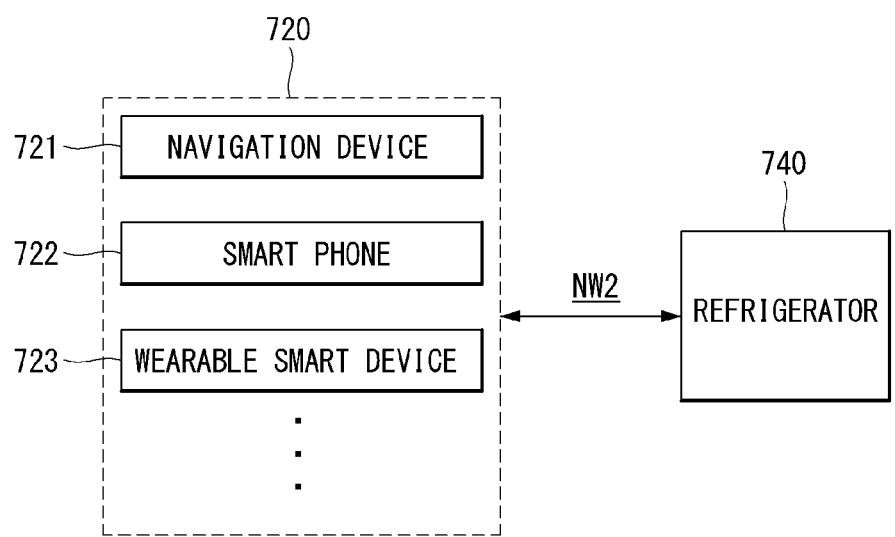
FIG. 11 is a block diagram showing an example embodiment of the arrival time information transmitter of FIGS. 7 and 8.

FIG. 11 is a block diagram showing an example embodiment of the arrival time information transmitter 720 of FIGS. 7 and 8.

Referring to FIG. 11, the arrival time information transmitter 720 may or may not be associated with the vehicle 10. The arrival time information transmitter 720 may be the navigation device 721 mounted on the vehicle 10. The navigation device 721 may transmit the information on the estimated time of arrival according to an activated map application to the arrival time information receiver 742 of the refrigerator 740 through the second communication network NW2.

The arrival time information transmitter 720 may be a smartphone 722 or a wearable smart device 723 worn by the user. The smart phone 722 or the wearable smart device 723 is worn by a user who carries the foodstuff to the refrigerator 740, and may transmit the information on the estimated time of arrival according to the activated map application to the arrival time information receiver 742 of the refrigerator 740 through the second communication network NW2.

Figure 12:
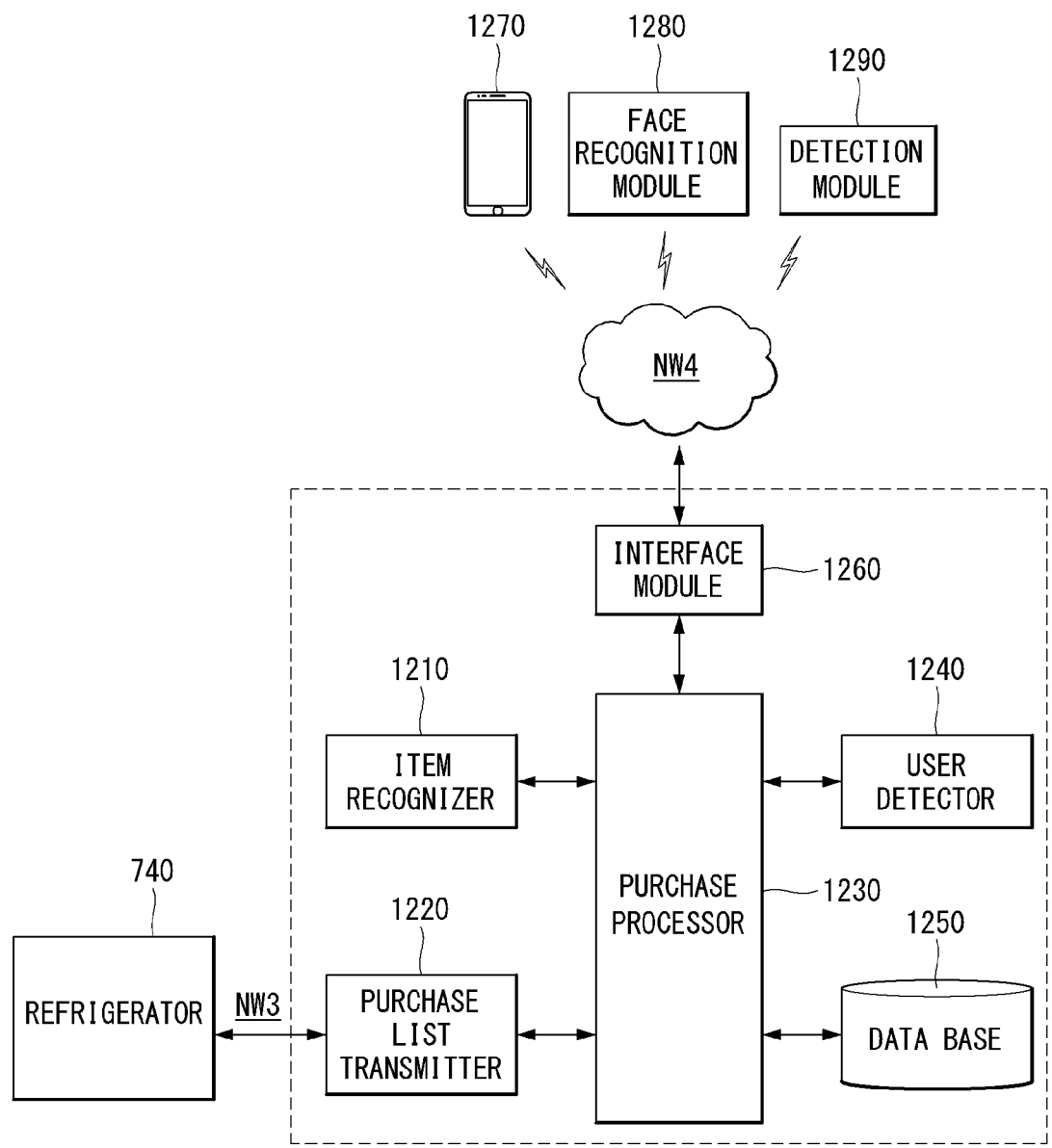
FIGS. 12 to 14 are block diagrams showing an embodiment of the foodstuff purchase information transmitter of FIG. 8.
Figure 13:
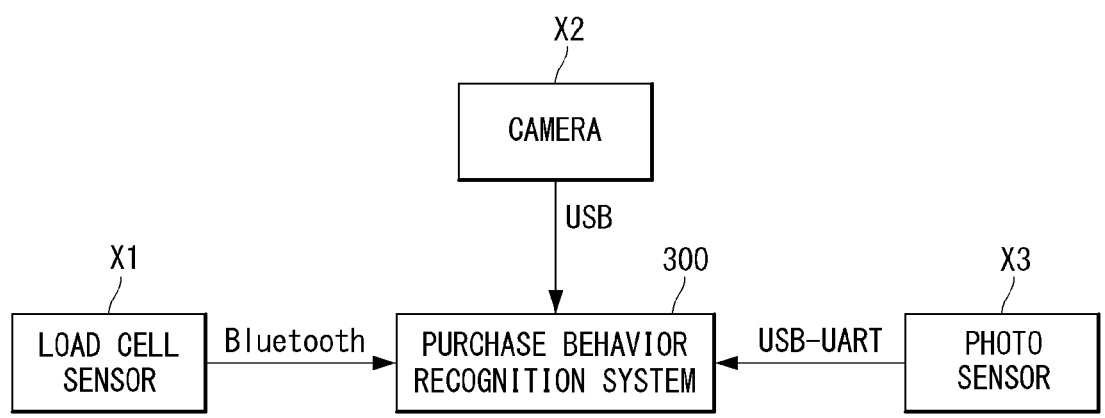
Figure 14:
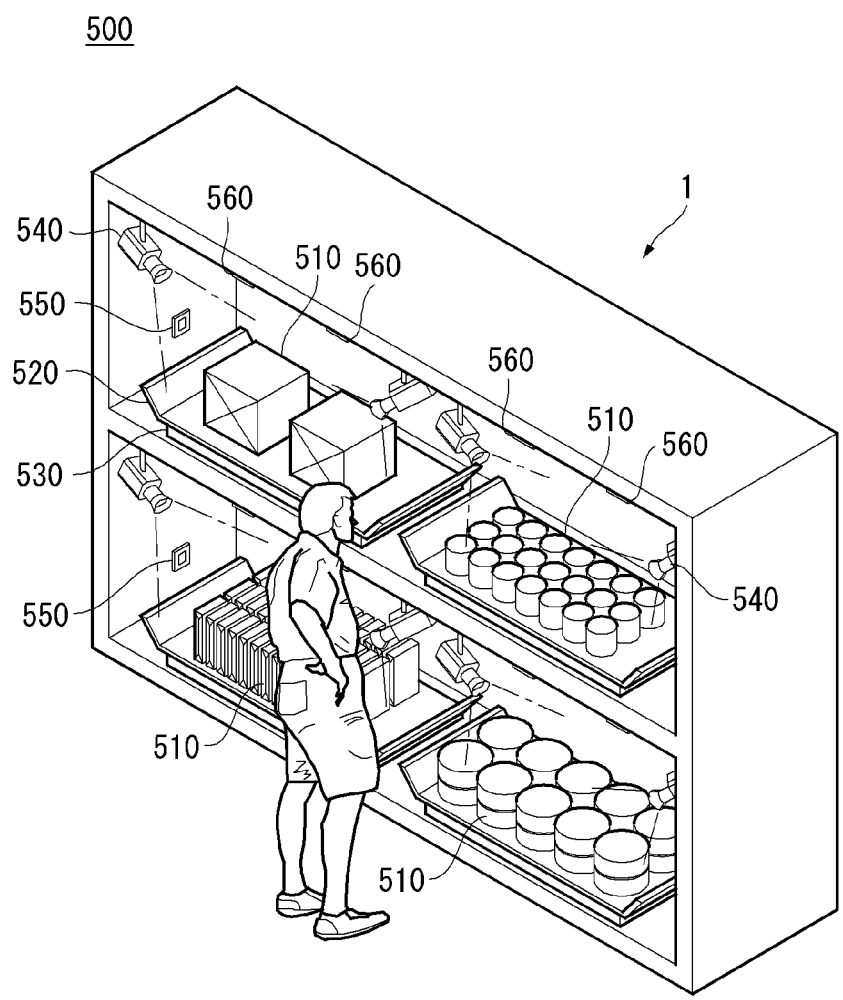

FIGS. 12 to 14 are block diagrams showing an embodiment of the foodstuff purchase information transmitter 730 of FIG. 8.

Referring to FIG. 12, the foodstuff purchase information transmitter 730 may be a purchase behavior recognition system 1200. The purchase behavior recognition system 1200 may include an item recognizer 1210, a purchase list transmitter 1220, a purchase processor 1230, a user detector 1240, a database 1250, and an interface module 1260.

The purchasing behavior recognition system 1200 may be further connected to a user device 1270, a face recognition module 1280, and a detection module 1290 through a fourth communication network NW4. The fourth communication network NW4 may be implemented as a local area network such as Bluetooth, a Radio Frequency Identification (RFID), an Infrared Data Association (IrDA), an Ultra Wideband (UWB), a ZigBee, or a Wi-Fi (Wireless Fidelity).

The user device 1270 is a terminal device possessed by a user such as a smart phone, a tablet, a wearable computer, and the like, and may mean all terminal devices capable of being connected to a site related to a store in which the foodstuff is displayed or providing or executing a service dedicated application. The user device 1270 may perform overall service operations such as service screen configuration, data input, data transmission/reception, data storage, payment, billing, or the like under the control of a web/mobile site or a dedicated application The item recognizer 1210 communicates with the detection module 1290 to recognize the plurality of foodstuffs displayed in the store. The detection module 1290 may include sensors X1 and X3 for detecting positions and weights of the plurality of foodstuffs located on a foodstuff display rack as shown in FIG. 13, and a camera X2 for obtaining images of the plurality of foodstuffs. That is, the detection module 1290 may include a load cell sensor X1, a camera X2, and a photo sensor X3. The load cell sensor X1 senses the weight of the plurality of foodstuffs. The photo sensor X3 may detect a row position and a column position of the plurality of foodstuffs and may sense a portion of a body of a user who selects the foodstuffs. The load cell sensor X1 may be a weight sensor, and the photo sensor X3 may be an optical sensor or an infrared sensor. The camera X2 may acquire images of the foodstuff and a portion of the body of the user in which the movement occurs in association with the sensors X1 and X3.

The item recognizer 1210 may more accurately recognize a foodstuff purchase behavior of the user through the detection module 1290 including a combination of the sensor and the camera, and may quickly detect a malfunction of the device. For example, the item recognizer 1210 may accurately recognize a pick up operation or a put down operation of the user through the detection module 1290.

The purchase list transmitter 1220 uploads information (including amount and type of foodstuff) on the foodstuff moved by the user from among the plurality of foodstuffs to a purchase list corresponding to the user information, and transmit the purchase list including the foodstuff purchase information to the foodstuff purchase information receiver 743 of the refrigerator 740 via the third communication network NW3.

The user detector 1240 may detect a user entering a specific space where the foodstuff is displayed and extract user information corresponding to the user. For example, the user detector 1240 may detect a user device 1270 entering the specific space or a user' face by using a short range wireless communication device or the face recognition module 1280 provided near an entrance of the specific space. Moreover, the user detector 1240 may extract user information corresponding to the identified user based on a user profile database (that is, customer information) stored in the data base 1250.

The purchase processor 1230 may update the user profile database included in the data base 1250 in real time. The purchase processor 1230 may upload purchase information on the moved foodstuff to the purchase list. Specifically, the purchase processor 1230 may determine the positions and weight of the plurality of foodstuffs received from the detection module 1290, whether the foodstuff moves, whether the foodstuff is located in a right position or is returned, and may upload the determination result to an inventor)/database included in the data base 1250. The inventor)/database may include a brand, a price, discount information, weight, a size, a category, an expiration date, a receipt date, an inventor)/date, identification information, manager information, precautions, and an image of the foodstuff Referring to FIG. 13, the purchase behavior recognition system 1200 may receive location information, weight information, and image information of the foodstuff and movement information and image information of the user from each of the load cell sensor X1, the camera X2, and the photo sensor X3 using a communication method of an USB, a Universal Asynchronous Receiver/Transmitter (US-BUART), or Bluetooth, and the purchase behavior recognition system 1200 may recognize the movement of the foodstuff and the movement of a portion of the body of the user using the received information.

Meanwhile, the purchase behavior recognition system 1200 may be connected to the load cell sensor X1, the camera X2, and the photo sensor X3 through a wired or wireless communication channel to transmit and receive information.

Referring to FIG. 14, the load cell sensor 530, the camera 540, and the photo sensors 550 and 560 may be provided near the display rack where the foodstuffs 510 are located. The display rack may include a plurality of shelves, and the plurality of foodstuffs 510 may be divided and displayed in units of an area 520 on each of the shelves. The load cell sensor 530 which detects the weight of the foodstuffs 510 may be positioned at a lower end of the region 520 where the plurality of foodstuffs 510 are displayed, and the camera 540 for acquiring the images of the foodstuffs 510 may be located on each display rack. In addition, the photo sensor 550 at a row position for detecting the row position of the foodstuffs 510, and the photo sensor 560 at a column position for detecting the column position of the foodstuffs 510 may be located on each display rack.

Figure 15:
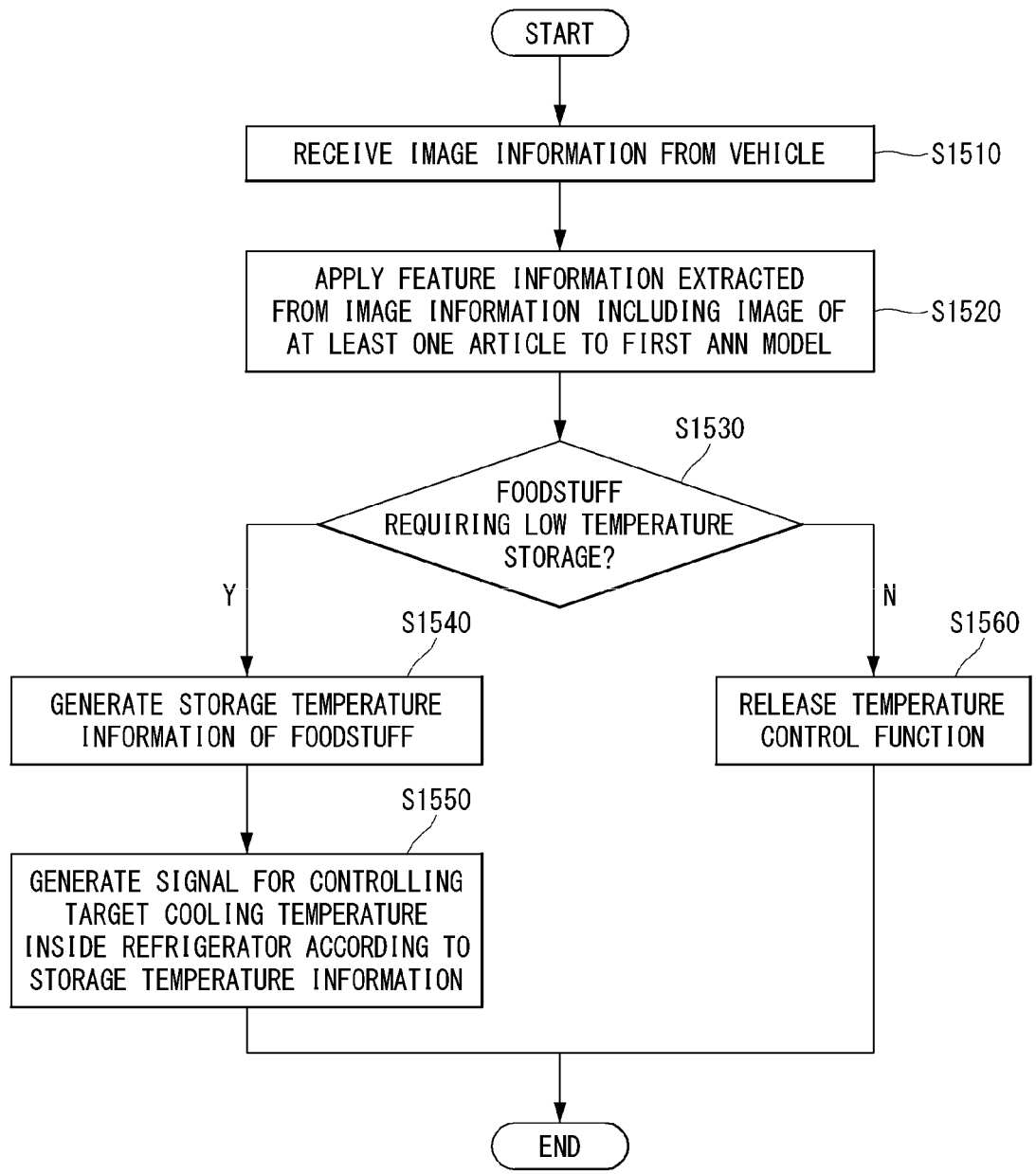
FIG. 15 is a flowchart of a method for controlling a temperature of a refrigerator provided in a vehicle according to an embodiment of the present disclosure.

Meanwhile, the foodstuff purchase information transmitter 730 of FIG. 8 may be implemented as a user portable terminal (wearable smart device, smart phone, or the like) instead of being implemented as the above-described purchase behavior recognition system 1200. The user portable terminal may be provided in the user who purchases the foodstuff and may transmit the foodstuff purchase information to the foodstuff purchase information receiver 743 of the refrigeration 740 through the third communication network NW3 using a purchase list application FIG. 15 is a flowchart of a method for controlling a temperature of the refrigerator 740 provided in the vehicle 10 according to an embodiment of the present disclosure.

The server may receive the image information from the vehicle 10 (S1510).

The image information may include an image obtained through a camera provided in the refrigerator 740 of the vehicle 10. The image information may include a top image or a side image of an article provided in the refrigerator 740. The image information may include an image of the foodstuff located in the refrigerator 740.

When the door of the refrigerator 740 of the vehicle 10 is opened, the camera located inside the refrigerator 740 may photograph an image of at least one article. An optical sensor may be provided in the door of the vehicle 10 to control an operation of the camera according to opening and closing of the door of the refrigerator 740. The optical sensor may receive external light when the door unit of the refrigerator 740 is opened, and determine whether the refrigerator 740 is opened or closed according to illumination change information obtained through the optical sensor. When it is determined that the illumination change inside the refrigerator 740 is equal to or more than a preset threshold value based on the illumination change information, the processor of the vehicle 10 may obtain an image of at least one article located inside the refrigerator 740 using the camera inside the refrigerator 740.

In this way, the server may receive the image obtained from the vehicle 10.

The server may apply feature information extracted from the image of at least one article included in the image information to a pre-learned first ANN model and determine whether the article is a foodstuff requiring low temperature storage according to an output value (S1520, 1530).

As described above, the image information may include the image of the foodstuff provided in the refrigerator 740, and the server may identify that there is the foodstuff inside the refrigerator 740 by analyzing the image information. Specifically, the server may apply the feature information extracted from the image information including the image of at least one foodstuff to the first ANN model and may determine whether the article located in the refrigerator 740 is the foodstuff requiring the low temperature storage according to the output value.

The first ANN model may be an artificial neutral network model trained by setting the image information of the foodstuff requiring the low temperature storage as learning data.

If the article located in the refrigerator 740 is determined to be the foodstuff requiring the low temperature storage, the server may generate storage temperature information of the foodstuff (S1540).

In the case of the foodstuff requiring the low temperature storage, the foodstuff is exposed to during a predetermined time at a predetermined temperature according to characteristics of the foodstuff, the characteristics may be altered. Therefore, when it is determined that the foodstuff requiring the low temperature storage exists, the server may generate storage temperature information of the foodstuff. The storage temperature information may include a recommended storage temperature corresponding to the detected foodstuff.

The recommended storage temperature can be collected through web crawling. Specifically, the server may collect the recommended storage temperature corresponding to the foodstuff requiring the low temperature storage through the web crawling, and store the collected recommended storage temperature in the memory in advance.

The server may generate a signal for controlling the target cooling temperature inside the refrigerator 740 according to the storage temperature information (S1550).

The vehicle 10 may cool the inside of the refrigerator 740 to a set temperature through a chilling pad or an air conditioning unit. The server may set the target cooling temperature inside the refrigerator 740 based on the storage temperature information, and may transmit a signal for controlling the operation of the refrigerator 740 to the vehicle 10 o maintain the temperature inside the refrigerator 740 of the vehicle 10 at the target cooling temperature.

In case where the temperature inside the refrigerator 740 is adjusted by the user even when the server transmits a control signal to the vehicle 10 to set the temperature inside the refrigerator 740 to a preset target cooling temperature based on sales information, the server sets a degree adjusted by the user as a reward to reinforcement-learn the first ANN model.

The inside of the refrigerator 740 of the vehicle 10 may set the target cooling temperature according to the control signal transmitted from a server. In this case, the vehicle 10 may cool or heat the inside of the refrigerator 740 through an air conditioning system provided in the refrigerator 740. The air conditioning system provided in the refrigerator 740 may include a chilling pad and an air conditioner of the refrigerator 740. The chilling pad may be cooled or heated while being in direct contact with an object located in the refrigerator 740. The chilling pad may include a thermoelectric element. The air conditioner of the refrigerator 740 may supply cold and hot air into the refrigerator 740. The air conditioner of the refrigerator 740 may also include a thermoelectric element.

If it is determined that the foodstuff requiring the low temperature storage does not exist in the image information received from the vehicle 10, the server may release a temperature control function of the refrigerator 740 provided in the vehicle 10 (S1560).

In this way, the temperature control method of the refrigerator 740 provided in the vehicle 10 determines whether there is an article requiring low temperature storage among the articles located therein based on the image information inside the refrigerator 740, and controls the temperature inside the refrigerator 740 according to the determination result. Accordingly, by storing the foodstuff according to the more accurate type and the recommended storage information of the foodstuff, it is possible to prevent the deterioration of the purchased foodstuff while traveling through the vehicle (10).

Figure 16:
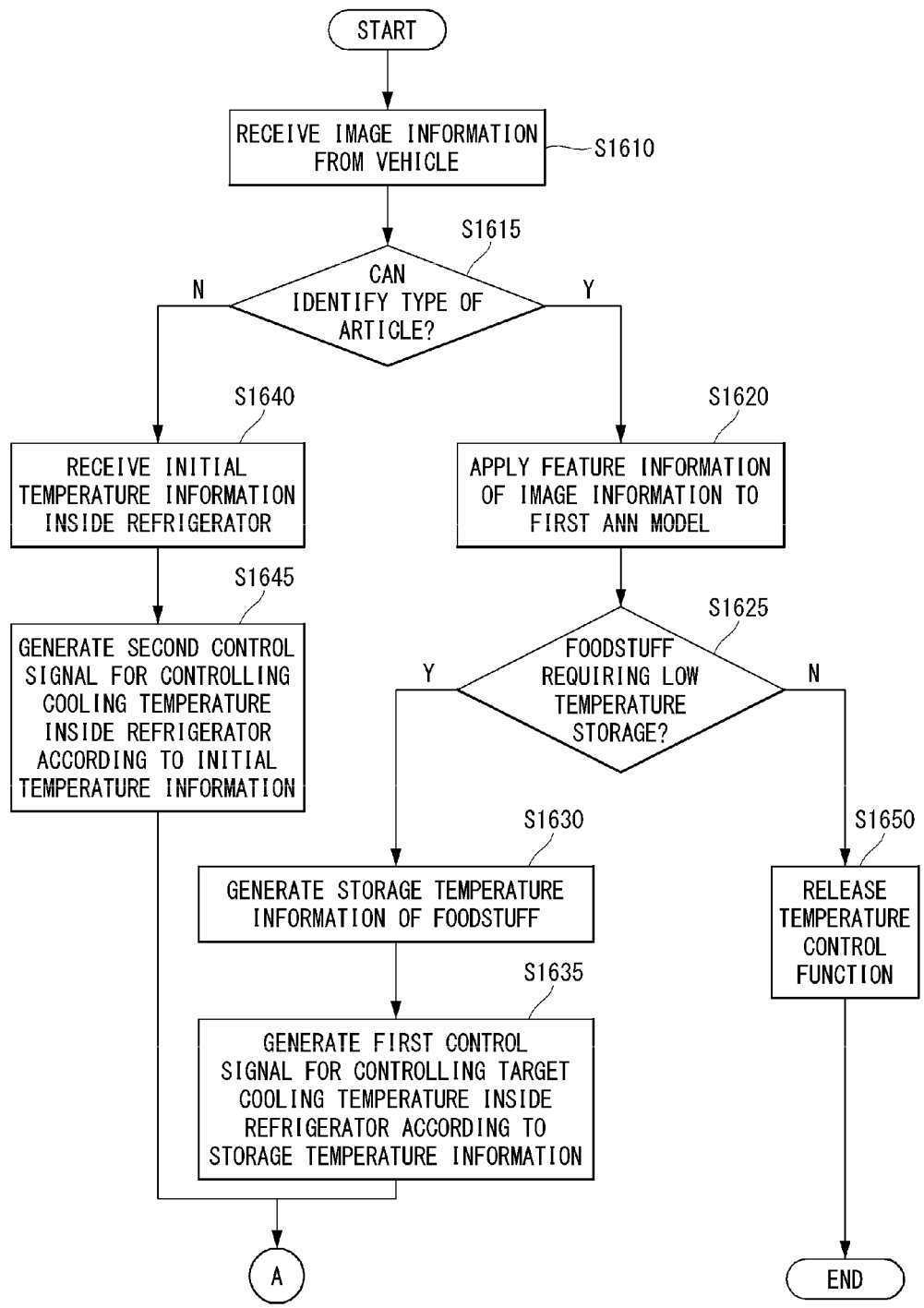
FIG. 16 is a general flowchart of a method for controlling a temperature of a refrigerator provided in a vehicle according to an embodiment of the present disclosure.

FIG. 16 is a general flowchart of a method for controlling a temperature of the refrigerator 740 provided in the vehicle 10 according to an embodiment of the present disclosure.

Referring to FIG. 16, the server may receive the image information from the vehicle 10 (S1610).

The image information may include the image obtained through the camera provided in the refrigerator 740 of the vehicle 10. The image information may include the top image or the side image of the article provided in the refrigerator 740. The image information may include the image of the foodstuff located in the refrigerator 740.

The server may determine whether the type of the article included in the image information can be identified by analyzing the image information received from the vehicle 10 (S1615).

For example, when the foodstuff is packaged in a container that cannot be inspected inside, such as a box, the server cannot detect the foodstuff located inside the box only by image information received from the vehicle 10. When it is not possible to determine which foodstuff is included based on the image information, processing of the server for an appropriate temperature control becomes a problem.

As a result of analyzing the image information, when the image information includes the image of foodstuff, as described above in FIG. 10, the server may generate a first control signal for controlling the temperature of the refrigerator 740 according to the analysis result and transmit the first control signal to the vehicle 10 (S1620, S1625, S1630, S1635).

The vehicle 10 may cool the inside of the refrigerator 740 to the predetermined temperature through the chilling pad or the air conditioner. The server sets a target cooling temperature inside the refrigerator 740 based on the storage temperature information, and controls an operation of the refrigerator 740 to maintain the temperature inside the refrigerator 740 of the vehicle 10 at the target cooling temperature. The signal may be transmitted to the vehicle 10.

In the method for setting the target cooling temperature of the refrigerator 740 according to an embodiment of the present disclosure, the server may set the target cooling temperature in proportion to the recommended temperature included in the storage temperature information. As described above, the recommended storage temperature obtained through the web crawling may include the recommended temperature.

When it is determined that the image of the foodstuff is included in the image information or the detected foodstuff is not the foodstuff requiring the low temperature storage, the server may release the temperature control function (S1650).

As a result of analyzing the image information received from the vehicle 10, when the image information does not include the image of foodstuff, the server may receive initial temperature information of the article located in the refrigerator 740 from the vehicle 10. (S1640).

The vehicle 10 may obtain the initial temperature information of the article through the temperature sensor provided inside the refrigerator 740. In this case, the temperature sensor may include a contact temperature sensor and a non-contact temperature sensor. In particular, the temperature sensor may include at least one of an infrared sensor or a thermal imaging camera. The infrared sensor provided in the vehicle 10 may emit light having an IR wavelength and receive a reflected wave reflected from at least one foodstuff located in the refrigerator 740 of the vehicle 10 to acquire the temperature information without coming into contact with the foodstuff. The thermal imaging cameras can also obtain thermal information using a wavelength in an infrared band. Unlike the infrared sensor, the thermal imaging camera may acquire an image including the thermal information.

The infrared sensor provided in the vehicle 10 may be turned on or off depending on whether the door of the refrigerator 740 is opened or closed. As soon as the door of the refrigerator 740 is closed, the infrared sensor may control an operation according to an output signal generated through a sensor provided in the door. In an embodiment of the present disclosure, the infrared sensor may be controlled to start temperature sensing as soon as the door is closed.

The initial temperature information may refer to the temperature information of the article when the article is initially supplied to the refrigerator 740 of the vehicle 10 (S1640).

For example, when the foodstuffs requiring a refrigeration storage or a freezing storage are provided, because the temperature is low, the server may determine that it is necessary to control the temperature inside the refrigerator 740 by using a cooling system. That is, the server may analyze the image information and control the temperature of the refrigerator 740 based on the initial temperature information regardless of whether the foodstuff is present and whether the detected foodstuff is the foodstuff requiring the low temperature storage.

The server may generate a second control signal for controlling the cooling temperature inside the refrigerator 740 based on the above-described initial temperature information (S1645).

The server may generate a second control signal for controlling the temperature of the refrigerator 740 to maintain the temperature inside the refrigerator 740 at an appropriate temperature based on the initial temperature information. The server may control the operation of the refrigerator 740 provided inside the vehicle 10 by transmitting the second control signal to the vehicle 10.

In a method for setting the cooling temperature by the second control signal according to an embodiment of the present disclosure, the server may determine whether the article corresponds to the foodstuff requiring the refrigeration storage or the foodstuff requiring the freezing storage based on the initial temperature information, and set the cooling temperature according to the type of the determined foodstuff. For example, the server may set the target cooling temperature of the refrigerator 740 to 10° C. in the case of the foodstuff requiring the freezing storage, and set the target cooling temperature of the refrigerator 740 to 15° C. in the case of the foodstuff requiring the refrigeration storage.

In the method for setting the cooling temperature according to an embodiment of the present disclosure, the server may set the target cooling temperature in proportion to the initial temperature information regardless of whether the article is the foodstuff requiring the freezing storage or the foodstuff requiring the refrigeration storage. For example, the lower the initial temperature measured by the temperature sensor, a lower target cooling temperature may be set, and the higher the initial temperature, a higher target cooling temperature may be set.

In an embodiment of the present disclosure, the server may analyze the temperature information to determine whether the low temperature storage is required. Specifically, the server may extract the feature information from the temperature information and determine whether low temperature storage is required based on the feature information. Particularly, in the case of a foodstuff which needs to maintain a constant temperature by setting a preset temperature as the target cooling temperature, the temperature of the foodstuff is relatively low compared to an ambient temperature or temperatures of other foodstuffs around when the foodstuff is located inside the refrigerator 740 after purchase of the foodstuff, and thus, the server can determine whether the low temperature storage is required by analyzing the temperature information. In this case, the server may generate a signal capable of controlling the temperature of the refrigerator 740 based on the temperature information regardless of whether the article is an article actually requiring the low temperature storage.

If it is determined that the foodstuff requiring the low temperature storage does not exist in the image information received from the vehicle 10, the server may release the temperature control function of the refrigerator 740 provided in the vehicle 10 (S1650).

In this way, even if the server cannot determine the foodstuff based on the image information, the server can control the temperature of the refrigerator 740 so that the foodstuff inside the vehicle 10 does not deteriorate by using the temperature information acquired from the temperature sensor provided in the refrigerator 740.

Figure 17:
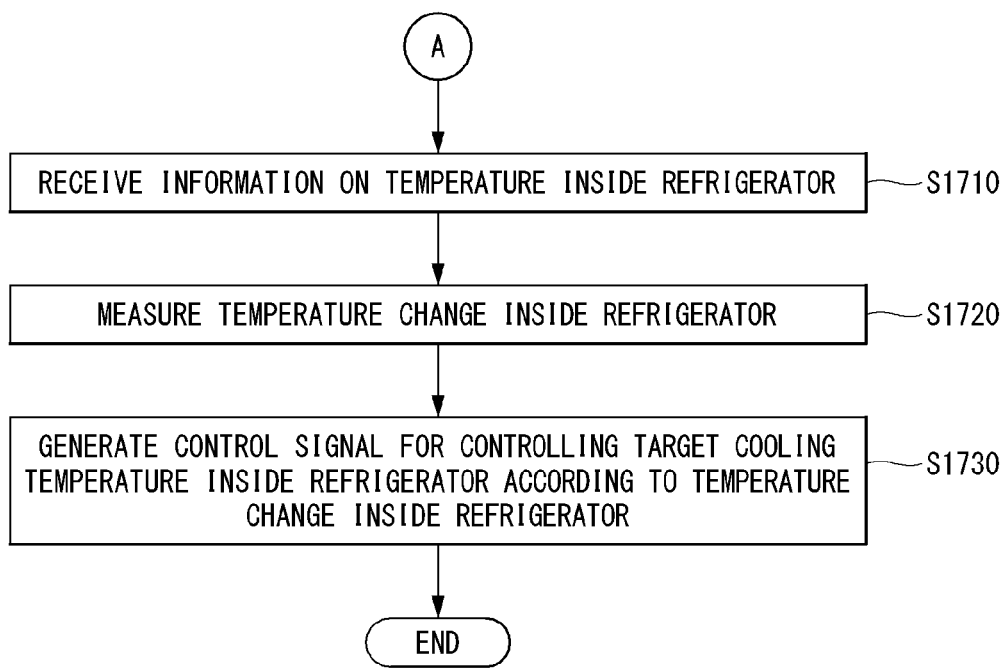
FIG. 17 is a flowchart of a method for controlling a temperature of a refrigerator according to a temperature change inside a refrigerator according to an embodiment of the present disclosure.

FIG. 17 is a flowchart of a method for controlling the temperature of the refrigerator 740 according to the temperature change inside the refrigerator 740 according to an embodiment of the present disclosure.

Referring to FIG. 17, the server may receive the information on the temperature inside the refrigerator 740 (S1710).

As described above, the server may receive the temperature information obtained from the temperature sensor provided in the refrigerator 740 of the vehicle 10. The server may receive the temperature information at specific time intervals. In this way, by receiving the temperature information at specific time intervals, the server monitors the temperature inside the refrigerator 740 to prevent the deterioration of the foodstuff due to external changes in real time.

The server may measure the temperature change inside the refrigerator 740 (S1720).

The server may measure the temperature change by comparing the temperatures measured at the specific time intervals with each other.

The server may generate a control signal for controlling the cooling temperature inside the refrigerator 740 according to the temperature change inside the refrigerator 740 (S1730).

The server may generate a control signal for controlling the target cooling temperature inside the refrigerator 740 according to the temperature change measured in step S1720. In this case, the target cooling temperature may be set in inverse proportion to the measured temperature change. For example, when the temperature increases by 2° C., the target cooling temperature may be set to be lower than the preset target cooling temperature. For another example, when the temperature decreases by 2° C., the target cooling temperature may be set to be higher than the preset target cooling temperature.

An external environment may be changed according to the driving of the vehicle 10, and when the initially preset target cooling temperature is maintained, the temperature inside the refrigerator 740 may be changed, and thus, the foodstuff may deteriorate. The present disclosure may reset the target cooling temperature according to the temperature change inside the refrigerator 740 by continuously monitoring the temperature inside the refrigerator 740. As a result, the present disclosure may generate a signal to control the refrigerator 740 to adapt to the changes in the external environment.

Figure 18:
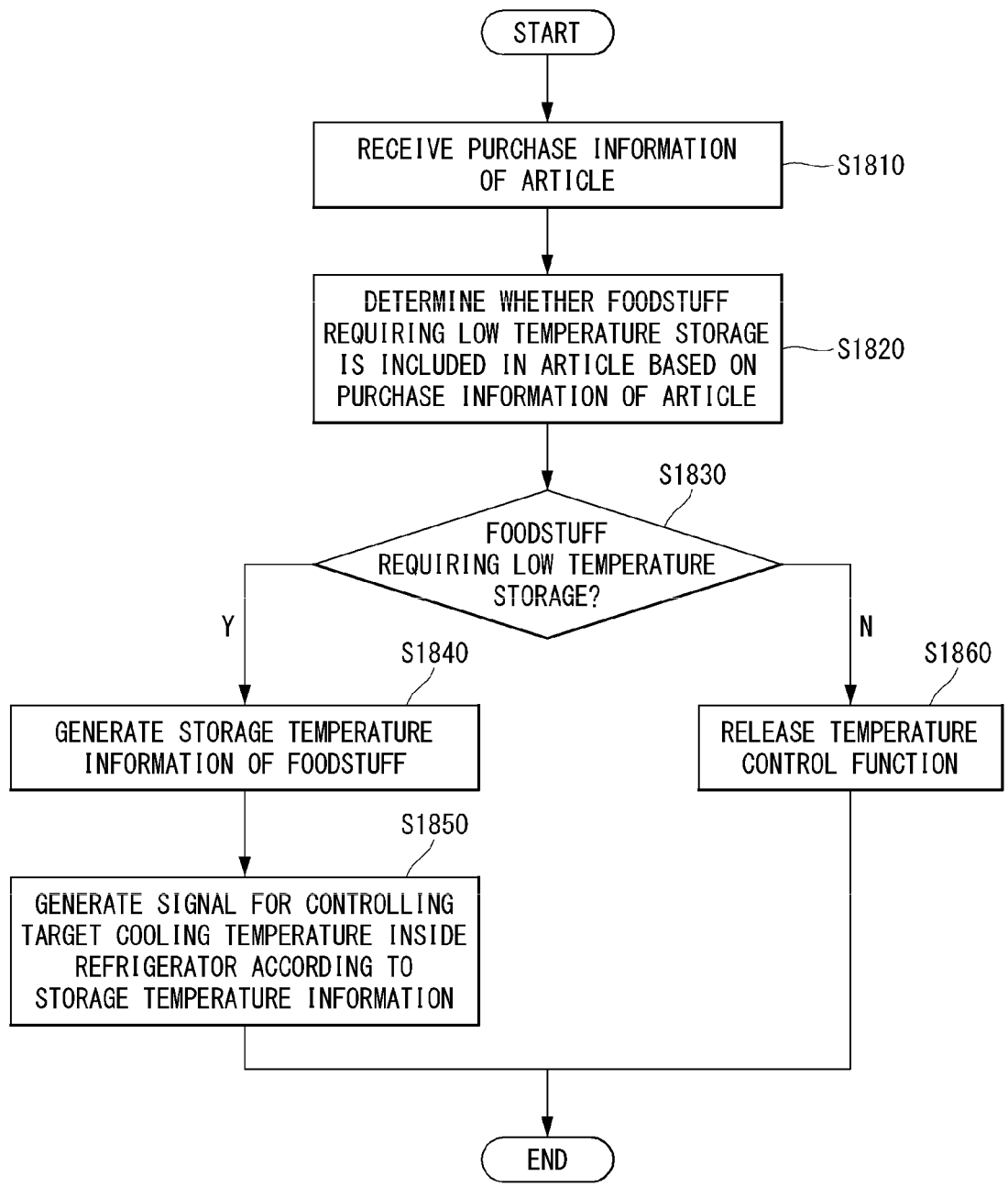
FIG. 18 is a flowchart of a method for controlling a temperature of a refrigerator according to article purchase information of a user according to an embodiment of the present disclosure.

FIG. 18 is a flowchart of a method for controlling a temperature of the refrigerator 740 according to article purchase information of a user according to an embodiment of the present disclosure.

Referring to FIG. 18, the server may receive the purchase information of the article (S1810).

The purchase information of the article may include at least one of the type, the amount, the recommended storage information, and temperature sensitivity of the purchased article.

The server may determine whether the article includes the foodstuff requiring the low temperature storage based on the purchase information of the article (S1820, S1830).

The server may generate the storage temperature information of the foodstuff (S1840).

The server may generate a signal for controlling the target cooling temperature inside the refrigerator 740 according to the storage temperature information (S1850).

The target cooling temperature may be set in proportion to the recommended storage information of the foodstuff included in the purchase information of the article.

When the foodstuff requiring the low temperature storage does not exist, the server may release the temperature control function (S1860).

That is, even if there is no image information or temperature information on the article, the present disclosure may detect the foodstuff requiring the low temperature storage by determining the type of the article using the purchase information of the article.

Figure 19:
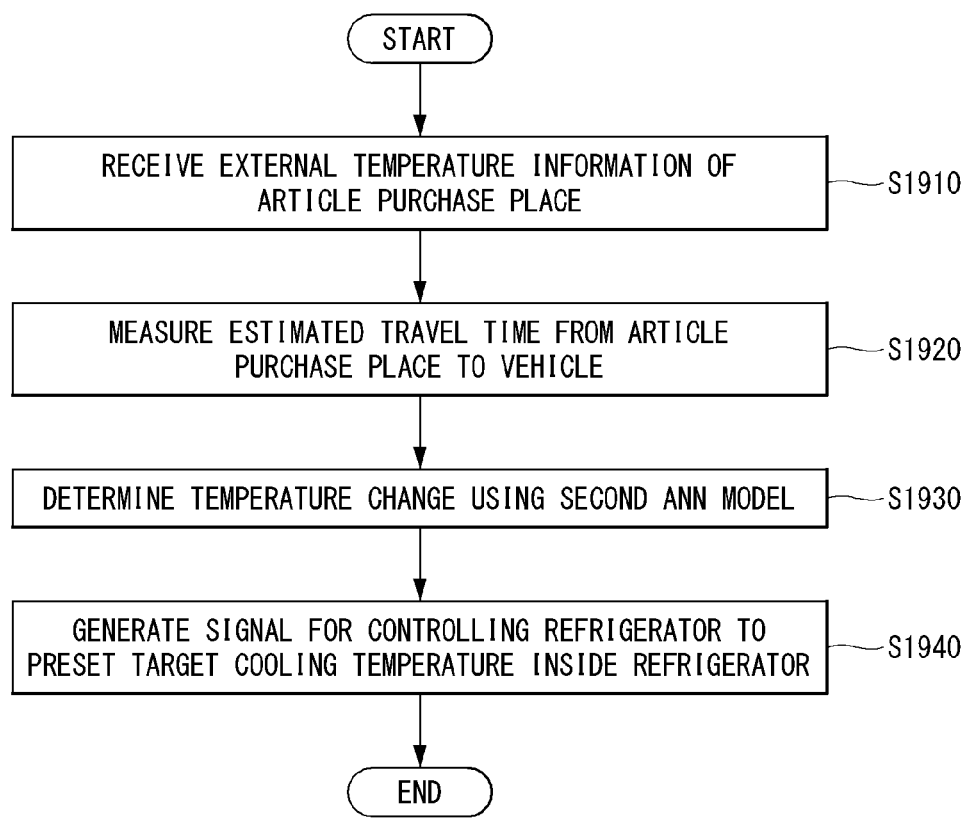
FIG. 19 is a flowchart of a method for presetting a target cooling temperature of a refrigerator according to an embodiment of the present disclosure.

FIG. 19 is a flowchart of a method for presetting the target cooling temperature of the refrigerator 740 according to an embodiment of the present disclosure.

The server may receive external temperature information of an article purchase place (S1910).

The server can determine the article purchase location of the user based on the purchase information on the article the moment the user purchases the article. The purchase information of the article may include address information of a seller, and the server may determine the article purchase place through the address information. The server may generate the external temperature information by searching the external temperature according to the determined article purchase place. For example, when Hong Gil-dong purchases an ice cream at a oo mart at a oo district, the server may determine an address of the oo mart using the purchase information and generate external temperature information of the oo mart The server may measure an estimated travel time from the article purchase place to the vehicle 10 (S1920).

The server may measure the estimated travel time of the user using a first location corresponding to the article purchase place of the user and a second location corresponding to the location of the vehicle 10. The vehicle 10 may include both an autonomous vehicle 10 or a manual drive vehicle 10. The article purchase place may be determined as described above in Step S1910.

The user terminal may analyze a daily movement pattern of the user, determine in advance a time of walking by the user, a time of moving by bicycle, a time of traveling by a public transportation, or the like, and transmit theses to the server. The server may measure the estimated travel time based on the movement time information of the user stored in advance and a distance between the first position and the second position The server may determine the foodstuff temperature change using a second ANN model (S1930).

The server may apply the external temperature information and the estimated travel time information to the second ANN model, and predict the temperature change of the foodstuff according to an output value.

The server may generate a signal for controlling the refrigerator 740 to preset the target cooling temperature inside the refrigerator 740 (S1940).

Before the door of the refrigerator 740 is opened, the target cooling temperature of the refrigerator 740 is preset in inverse proportion to the estimated temperature change of the article, and the target cooling temperature of the refrigerator 740 is differently set according to the temperature sensitivity according to the type and the amount of the purchased article.

That is, the present disclosure may more effectively maintain the freshness of the article by controlling in advance the temperature of the refrigerator 740 for a constant temperature storage based on the temperature change of the article and a required time until the article is received in the refrigerator 740.

Figure 20:
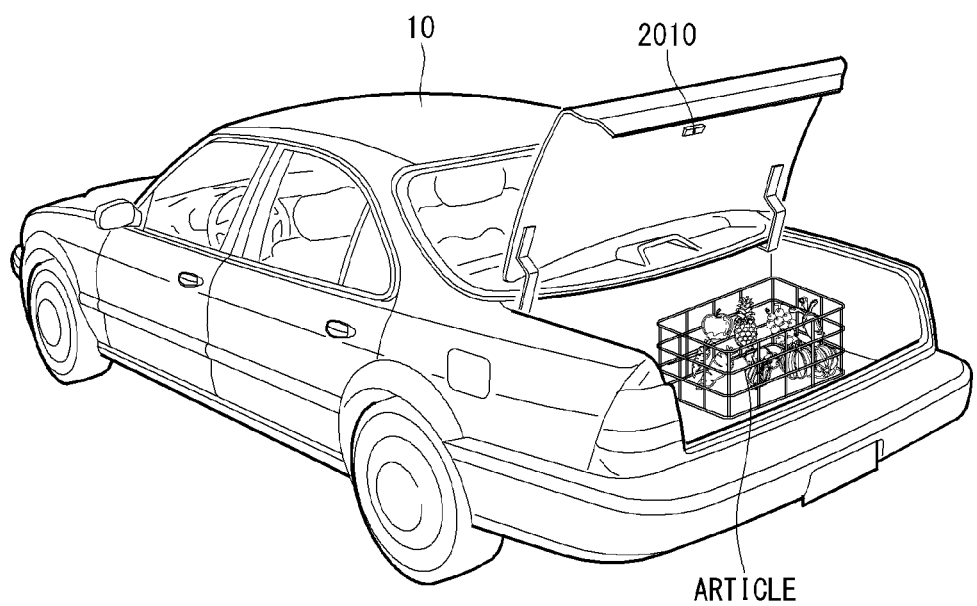
FIGS. 20 to 22 are views for explaining an embodiment of a method for controlling a temperature of a refrigerator provided in a vehicle of the present disclosure.
Figure 21:
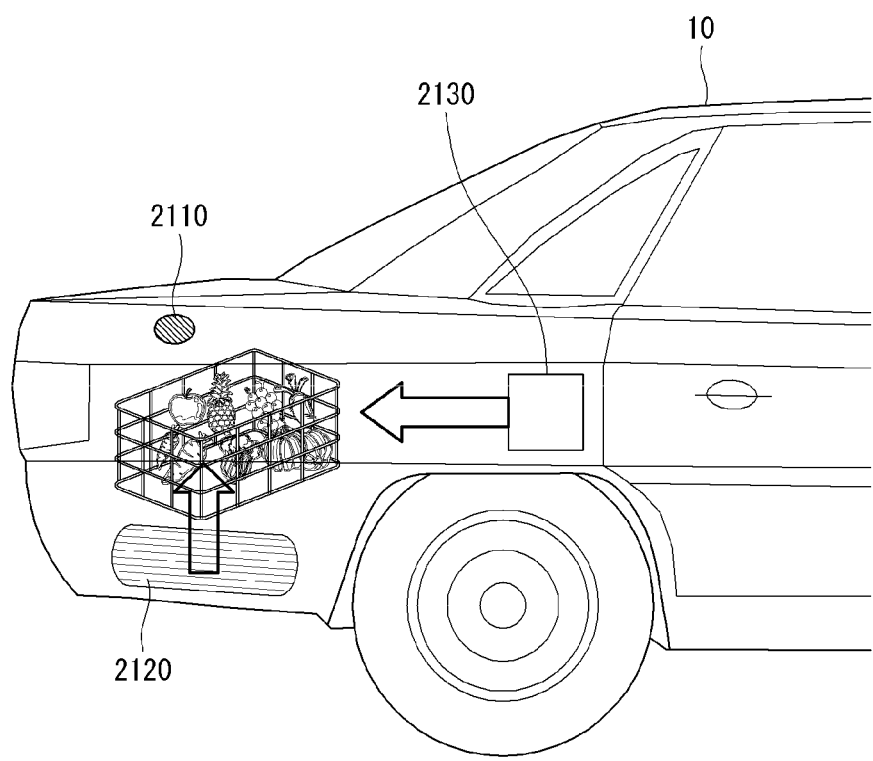
Figure 22:
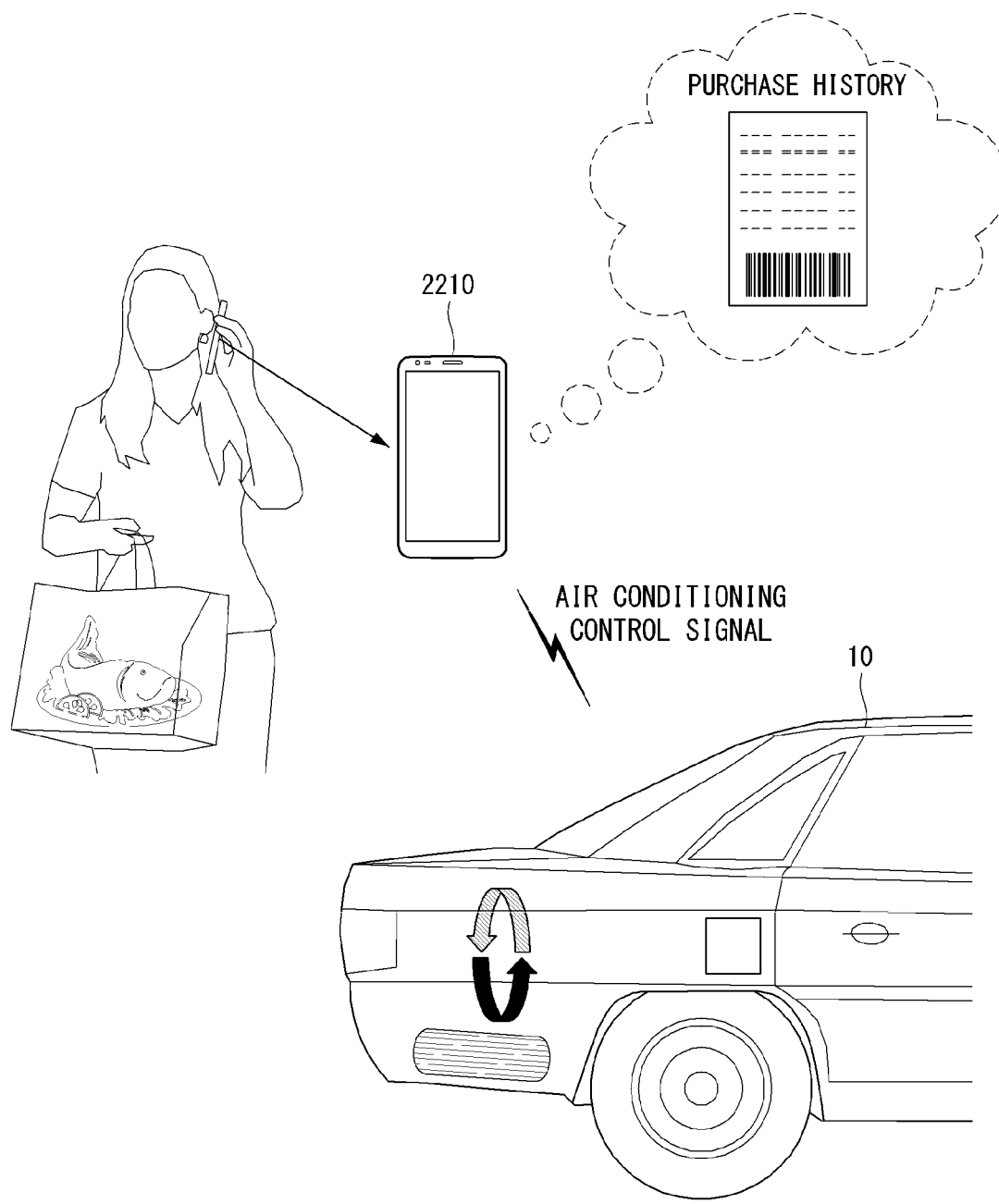

FIGS. 20 to 22 are views for explaining an embodiment of a method for controlling the temperature of the refrigerator 740 provided in the vehicle 10 of the present disclosure.

Referring to FIG. 20, the refrigerator 740 may be provided in a trunk of the vehicle 10. The door of the refrigerator 740 may be designed as a trunk door of the vehicle 10. A camera 2010 may be provided at a door of the refrigerator 740 to acquire the image of the article inside the refrigerator 740.

The camera 2010 processes an image frame such as a still image or a moving image obtained by the image sensor. The image frame processed by the camera 2010 may be stored in a memory or transmitted to an external device through a wireless communication device. In addition, the location information of the user or the like may be calculated from the image frame obtained by the camera 2010. Two or more cameras 2010 may be provided according to a use environment.

Referring to FIG. 21, the refrigerator 740 provided in the vehicle 10 may further include a temperature sensor 2110. The temperature sensor 2110 may sense the temperature inside the refrigerator 740 when the door of the refrigerator 740 is closed. As described above with reference to FIGS. 15 to 19, the vehicle 10 may control the cooling temperature of the refrigerator 740 according to the generated control signal. The vehicle 10 may control the temperature inside the refrigerator 740 using a cooling system including an air conditioner 2130 and a chilling pad 2120.

Referring to FIG. 22, a user terminal 2210 may transmit the purchase information of the article to the server. The purchase information of the article may include a purchase history of the article. The server may generate an air conditioning control signal according to the purchase information received from the user terminal 2210, and transmit the generated air conditioning control signal to the vehicle 10.

Figure 23:
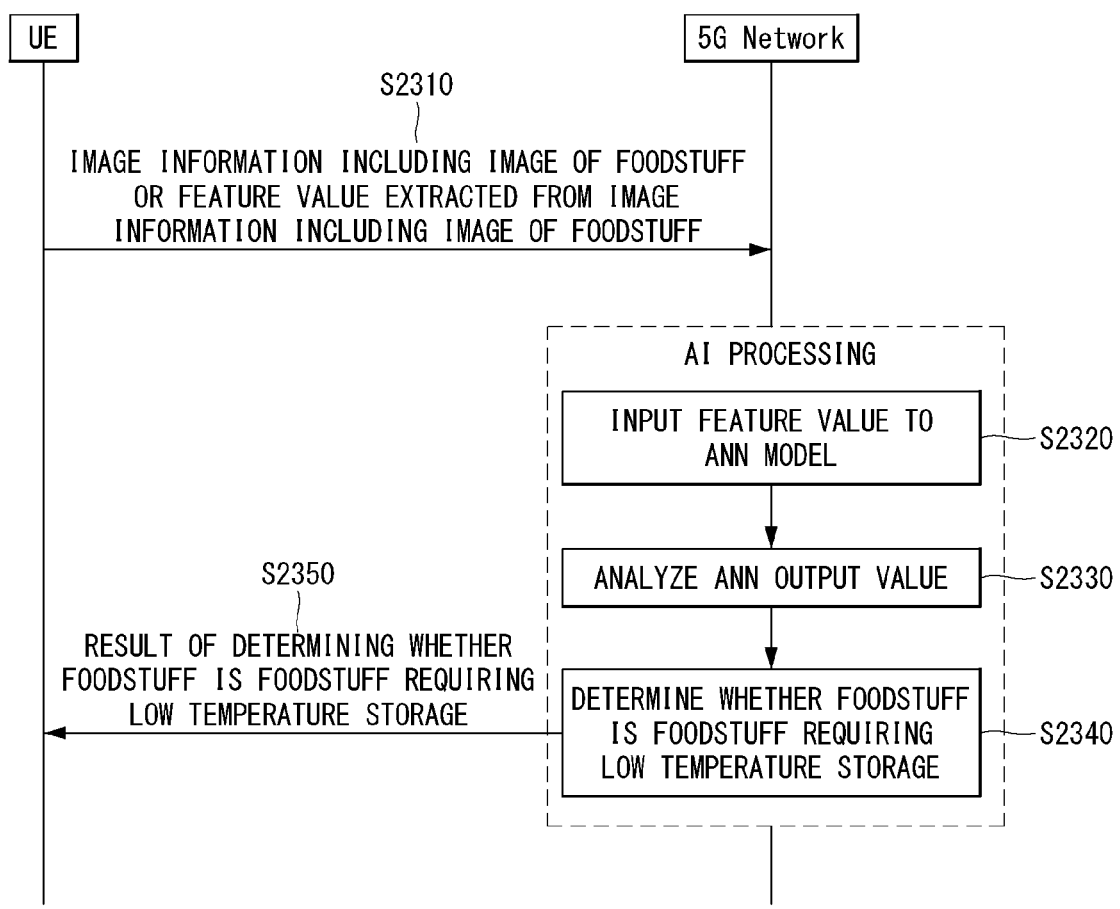
FIG. 23 is a flowchart of an example executing a step for determining whether the foodstuff is a foodstuff requiring a low temperature storage, through AI processing of a 5G network.

FIG. 23 is a flowchart of an example executing a step for determining whether the foodstuff is a foodstuff requiring the low temperature storage, through AI processing of a 5G network.

Referring to FIG. 23, a processor may control a communication module to transmit a feature value extracted from image information including an image of at least one article to an AI processor included in a 5G network. In addition, the processor may control the communication module to receive AI processed information from the AI processor.

Meanwhile, the processor may perform an initial connection procedure with the 5G network to transmit the image information including the image of at least one article to the 5G network. The processor may perform the initial connection procedure with the 5G network based on a synchronization signal block (SSB).

In addition, the processor may receive, from the network, downlink control information (DCI) used to schedule transmission of the image information including the image of at least one article via the communication module.

The processor may transmit the image information including the image of the at least one article or the feature value extracted from the image information including the image of the at least one article to the 5G network, based on the DCI.

The image information including the image of the at least one article or the feature value extracted from the image information including the image of the at least one article is transmitted to the 5G network through the PUSCH, and the SSB and the DM-RS of the PUSCH may be quasi co-located (QCL) for QCL type D.

Referring to FIG. 23, the processor may transmit the image information including the image of the at least one article or the feature value extracted from the image information including the image of the at least one article to a 5G network through the communication module (S2310).

Here, the 5G network may include an AI processor or an AI system, and the AI system of the 5G network may perform AI processing based on received sensing information (S2320).

The AI system may input the feature values received from the vehicle 10 into the ANN model (S2330). The AI system may analyze an ANN output value and calculate a weight from the ANN output value (S2340). The 5G network may determine whether the foodstuff is the foodstuff requiring the low temperature storage based on the weight calculated by the AI system, and update information including the determination result (S2350).

Although the embodiment illustrated in FIG. 23 is described based on the embodiment performed by the server or the AI processor, the operation may be performed by the processor of the external device.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein Effects of the method for controlling the temperature of the refrigerator provided in the vehicle according to an embodiment of the present disclosure are as follows.

The present disclosure can detect the foodstuff requiring the low temperature storage based on the image information Moreover, the present disclosure can control the storage temperature of the foodstuff based on the temperature information In addition, the present disclosure can control the temperature of the refrigerator based on the purchase information of the article and the location information of the vehicle.

Effects obtained in the present disclosure are not limited to the effects mentioned above, and other effects not mentioned can be clearly understood by a person skilled in the art from the above descriptions.

What is claimed is:

1. A method for controlling a temperature of a refrigerator in a vehicle, the method comprising:
   receiving image information including an image of an article inside the refrigerator in the vehicle;
   extracting feature information from the image information;
   applying the feature information to a pre-learned first artificial neutral network (ANN) model;
   in response to determining that the article includes a foodstuff requiring a low temperature storage based on an output value of the first ANN model, searching recommended storage information of the foodstuff to generate storage temperature information and generating a control signal for controlling a target cooling temperature inside the refrigerator according to the storage temperature information;
   performing an initial connection procedure with a network based on a synchronization signal block (SSB);
   receiving, from the network, downlink control information (DCI) used to schedule transmission of the image information; and
   transmitting the image information to the network based on the DCI,
   wherein the image information is transmitted to the network through a physical uplink shared channel (PUSCH), and
   wherein the SSB and a demodulation reference signal (DM-RS) of the PUSCH is quasi co-located (QCL) for QCL type D.

2. The method of claim 1, wherein the refrigerator is in a trunk of the vehicle.

3. The method of claim 1, further comprising:
   receiving internal temperature information of a temperature inside the refrigerator.

4. The method of claim 3, wherein the internal temperature information is acquired by at least one of an infrared sensor in the refrigerator or a thermal imaging camera in the refrigerator.

5. The method of claim 3, further comprising:
   adjusting the target cooling temperature inside the refrigerator based on the internal temperature information.

6. The method of claim 3, further comprising:
   receiving the internal temperature information at specific time intervals.

7. The method of claim 6, further comprising:
measuring a temperature change based on the internal temperature information received at the specific time intervals; and
adjusting the target cooling temperature based on the temperature change.

8. The method of claim 1, further comprising:
receiving purchase information of the foodstuff.

9. The method of claim 8, wherein the purchase information includes at least one of a purchase place of the foodstuff, a type of the foodstuff an amount of the foodstuff, recommended storage information for the foodstuff, temperature sensitivity of the foodstuff, or an external temperature of the purchase place of the food stuff.

10. The method of claim 8, further comprising:
determining whether the purchased foodstuff requiring the low temperature storage is included in the article based on the purchase information.

11. The method of claim 8, wherein the generating the control signal for controlling the target cooling temperature inside the refrigerator occurs in advance based on the purchase information of the foodstuff before the article is placed inside the refrigerator in the vehicle.

12. The method of claim 11, wherein the generating the control signal for controlling the target cooling temperature includes:
receiving location information of the vehicle;
measuring an estimated travel time from an article purchase place of the article to a location of the vehicle;
applying external temperature information of the article purchase place and the estimated travel time to a second ANN model;
predicting a temperature change of the purchased foodstuff based on an output value of the second ANN model; and
generating the control signal for controlling the target cooling temperature based on the predicted temperature change of the purchased foodstuff.

13. The method of claim 12, wherein the target cooling temperature of the refrigerator is set in inverse proportion to the predicted temperature change of the purchased foodstuff before a door of the refrigerator is opened or before the purchased foodstuff is placed in the refrigerator.

14. A device for controlling a temperature of a refrigerator in a vehicle, the device comprising:
a receiver configured to receive image information including an image of an article inside the refrigerator in the vehicle; and
at least one processor configured to:
extract feature information from the image information,
apply the feature information to a pre-learned first artificial neutral network (ANN) model,
in response to determining that the article includes a foodstuff requiring a low temperature storage based on an output value of the first ANN model, search recommended storage information of the foodstuff to generate storage temperature information and generate a control signal for controlling a target cooling temperature inside the refrigerator according to the storage temperature information,
perform an initial connection procedure with a network based on a synchronization signal block (SSB),
receive, from the network, downlink control information (DCI) used to schedule transmission of the image information, and
transmit the image information to the network based on the DCI,
wherein the image information is transmitted to the network through a physical uplink shared channel (PUSCH), and
wherein the SSB and a demodulation reference signal (DM-RS) of the PUSCH is quasi co-located (QCL) for QCL type D.

15. The device of claim 14, wherein the refrigerator is in a trunk of the vehicle.

16. The device of claim 14, wherein the at least one processor is further configured to:
receive internal temperature information of a temperature inside the refrigerator via the receiver, and
adjust the target cooling temperature inside the refrigerator based on the internal temperature information.

17. The device of claim 14, wherein the at least one processor is further configured to:
receive internal temperature information of a temperature inside the refrigerator at specific time intervals via the receiver,
measure a temperature change based on the internal temperature information received at the specific time intervals, and
adjust the target cooling temperature based on the temperature change.

18. The device of claim 14, wherein the at least one processor is further configured to:
receive purchase information of the foodstuff via the receiver,
determine whether the purchased foodstuff requiring the low temperature storage is included in the article based on the purchase information, and
generate the control signal for controlling the target cooling temperature inside the refrigerator in advance based on the purchase information of the purchased foodstuff before the article is placed inside the refrigerator in the vehicle.

* * * * *